United States Patent
Frink et al.

(10) Patent No.: US 7,885,270 B2
(45) Date of Patent: Feb. 8, 2011

(54) STATISTICAL MULTIPLEXING OF COMPRESSED VIDEO STREAMS

(75) Inventors: Craig Frink, Chelmsford, MA (US); Michael G. Hluchyj, Wellesley, MA (US); Santosh Krishnan, Wellesley, MA (US); Christopher Lawler, Wellesley, MA (US); Robert Ryan, Marlboro, MA (US)

(73) Assignee: Verlvue, Inc., Westford, MA (US)

( * ) Notice: Subject to any disclaimer, the term of this patent is extended or adjusted under 35 U.S.C. 154(b) by 97 days.

(21) Appl. No.: 12/121,500

(22) Filed: May 15, 2008

(65) Prior Publication Data

US 2009/0285217 A1  Nov. 19, 2009

(51) Int. Cl.
*H04L 12/56* (2006.01)

(52) U.S. Cl. .................. 370/395.4; 370/252; 370/338; 370/473

(58) Field of Classification Search ........... 370/395.4, 370/230, 229, 394, 252, 473, 537
See application file for complete search history.

(56) References Cited

U.S. PATENT DOCUMENTS 5,216,503 A  6/1993  Paik et al. ............... 358/133
5,231,633 A  7/1993  Hluchyj et al. ........... 370/94.1

(Continued)

FOREIGN PATENT DOCUMENTS

CA  2 400 654  8/2001

(Continued)

OTHER PUBLICATIONS

Björk et al., "Transcoder Architectures for Video Coding," *IEEE Transactions on Consumer Electronics*, 44(1): 88-98 (Feb. 1998).

(Continued)

*Primary Examiner*—William Trost, IV
*Assistant Examiner*—Emmanuel Maglo
(74) *Attorney, Agent, or Firm*—Proskauer Rose LLP

(57) ABSTRACT

Described are computer-based methods and apparatuses, including computer program products, for statistical multiplexing of compressed video streams. A deadline of a packet of a compressed video stream is computed based on a program clock reference value of the packet. A plurality of packets, which includes the packet, is sorted based on deadlines corresponding to the packets. A next packet from the sorted plurality of packets is selected, the next packet having a corresponding deadline nearest to a system clock time. The next packet is transmitted.

37 Claims, 10 Drawing Sheets

U.S. PATENT DOCUMENTS

| | | | |
|---|---|---|---|
| 5,499,046 A | | 3/1996 | Schiller et al. |
| 5,550,577 A | | 8/1996 | Verbiest et al. |
| 5,594,490 A | | 1/1997 | Dawson et al. |
| 5,805,804 A | | 9/1998 | Laursen et al. |
| 5,878,220 A | | 3/1999 | Olkin et al. |
| 5,982,418 A | * | 11/1999 | Ely ........................... 348/153 |
| 6,055,577 A | | 4/2000 | Lee et al. |
| 6,490,254 B1 | * | 12/2002 | Larsson et al. ............. 370/252 |
| 6,678,332 B1 | | 1/2004 | Gardere et al. |
| 6,690,683 B1 | * | 2/2004 | Brunheroto et al. ......... 370/542 |
| 6,714,545 B1 | | 3/2004 | Hugenberg et al. |
| 6,937,770 B1 | | 8/2005 | Oguz et al. |
| 6,971,119 B1 | | 11/2005 | Arsenault et al. |
| 7,333,436 B2 | * | 2/2008 | Fukuda et al. ........... 370/235.1 |
| 7,561,515 B2 | | 7/2009 | Ross |
| 7,624,416 B1 | | 11/2009 | Vandermolen et al. |
| 2002/0019984 A1 | | 2/2002 | Rakib |
| 2003/0051251 A1 | | 3/2003 | Sugimoto et al. |
| 2003/0208765 A1 | | 11/2003 | Urdang et al. |
| 2004/0218093 A1 | | 11/2004 | Radha et al. |
| 2004/0218617 A1 | * | 11/2004 | Sagfors ....................... 370/412 |
| 2005/0039213 A1 | | 2/2005 | Matarese et al. |
| 2005/0188099 A1 | * | 8/2005 | Patel .......................... 709/236 |
| 2005/0265254 A1 | * | 12/2005 | Yabuta et al. ............... 370/252 |
| 2006/0165088 A1 | * | 7/2006 | Monta et al. ............. 370/395.4 |
| 2006/0230176 A1 | | 10/2006 | Dacosta |
| 2007/0070895 A1 | * | 3/2007 | Narvaez ..................... 370/230 |
| 2009/0180534 A1 | | 7/2009 | Hluchyj et al. |
| 2009/0217318 A1 | | 8/2009 | VerSteeg et al. |

FOREIGN PATENT DOCUMENTS

| | | |
|---|---|---|
| CA | 2 466 458 | 12/2004 |
| EP | 1 379 088 | 1/2004 |
| EP | 1 675 399 | 6/2006 |

OTHER PUBLICATIONS

Haskell, Barry G., "Multiplexing of Variable Rate Encoded Streams," *IEEE Transactions on Circuits and Systems for Video Technology*, 4(4): 417-424 (Aug. 1994).

Salehi et al., "Supporting Stored Video: Reducing Rate Variability and End-to-End Resource Requirements Through Optimal Smoothing," *IEEE/ACM Transactions on Networking*, 6(4): 397-410 (Aug. 1998).

Zhang et al., "Smoothing, Statistical Multiplexing, and Call Admission Control for Stored Video," *IEEE Journal on Selected Areas in Communications*, 15(6): 1148-1166 (Aug. 1997).

ISO/IEC 13818-1: ITU-T Recommendation H.222.0: Series H: Audiovisual and Multimedia Systems: Infrastructure of Audiovisual Services—Transmission Multiplexing and Synchronization; Information Technology-Generic Coding of Moving Pictures and Associated Audio Information Systems: 1-171 (May 27, 1999).

ISO/IEC 13818-2: ITU-T Recommendation H.262: Series H: Audiovisual and Multimedia Systems: Infrastructure of Audiovisual Services—Coding of Moving Video Information Technology—Generic Coding of Moving Pictures and Associated Audio Information: Video: 1-220 (Feb. 17, 2000).

ISO/IEC 14496-10: ITU-T Recommendation H.264: Series H: Audiovisual and Multimedia Systems: Infrastructure of Audiovisual Services—Coding of Moving Video: Advanced Video Coding for Generic Audiovisual Services: 1-343 (Mar. 1, 2005).

Jianghong D., et al., "Scheduling Algorithm for MPEG-2 TS Multiplexers in CATV Networks," *IEEE Transactions on Broadcating*, 46(4):249-255 (2000).

Zhang, Y., et al., "Integrated Rate Control and Buffer Management for Scalable Video Streaming," *IEEE*, 248-251 (2007).

Zhang, Y., et al., "Joint Rate Allocation and Buffer Management for Robust Transmission of VBR Video," *Acta Automatica Sinica*, 34(3):337-343(2008).

\* cited by examiner

STATISTICAL MULTIPLEXING OF COMPRESSED VIDEO STREAMS

FIELD OF THE INVENTION

The present invention relates generally to computer-based methods and apparatuses, including computer program products, for statistical multiplexing of compressed video streams.

BACKGROUND

Digital compressed video based on the MPEG set of standards is now a popular choice for delivering and storing broadcast quality video. The MPEG-2 suite, specified by ISO/IEC 13818, is already widely deployed, while the newer MPEG-4 suite, specified by ISO/IEC 14496 is rapidly gaining acceptance. In general, MPEG distinguishes between a "compression" layer, responsible for coding the raw video and associated audio signals, and the "systems" layer, responsible for the carriage, synchronization and timing of multiple such compressed signals. The units generated by the systems layer are referred to generically as "transport stream" (TS) packets. TS packets are transmitted over fixed bandwidth links.

In a typical MPEG-2 encoder, the compression layer receives a periodic sequence of frames of uncompressed digital video, and converts it into an "elementary stream" of compressed frames. While the compression layer output consists of a sequence of frames with a fixed inter-frame interval, the sizes of the frames may vary widely depending upon the quality settings of the encoder and the efficiency gained by removing spatial (i.e., within a single frame) and temporal (i.e., across frames) redundancy from the uncompressed input. The systems layer multiplexes several such elementary streams (e.g., video, audio and data), belonging to one or more video programs, into a single transport stream, consisting of a sequence of TS packets, suitable for storage and network transmission of the program(s). Several, possibly interleaved, TS packets put together comprise a single compressed frame.

In addition to multiplexing and packetization, the systems layer performs several roles including, for example, clocking stream synchronization and timing control. The MPEG-2 encoder communicates a time-base referred to as a Program Clock Reference (PCR) to the receiver of the stream via a field in the TS packet header. The encoder tightly controls the timing of each packet by appropriately choosing its PCR value. A PCR value denotes the relative departure time of the packet at the sender. The systems layer assumes a constant-delay transmission network and relies on higher layers to compensate for delay jitter in the network, if any. Consequently, the PCR also denotes the relative arrival time of the packet at the receiver. The tight control of the departure (and arrival) timing ensures that as long as a TS packet arrives at the decoder at its indicated PCR value, the decoder can re-create the original periodic sequence of frames without danger of underflow (e.g., which results in "freeze frame" artifacts) or overflow (e.g., which results in visual glitches) of its buffers.

Additionally, in open-loop networks, the PCR may also be used by the decoder to lock its clock to that of the sender, so as to maintain an identical frame period as at the input to the encoder. In order to control and synchronize the decoding process and the display time of each video and audio frame, the encoder communicates a Decode Time-Stamp (DTS) and Presentation Time-Stamp (PTS), respectively, one each for every frame. A compliant MPEG-2 receiver essentially receives TS packets belonging to a frame at their indicated PCR values and buffers them temporarily. A frame is removed from the buffer and decoded at its specified DTS value, and is presented to the viewer at its PTS value. In some transport networks, multiple TS packets may be encapsulated into a single real-time transport protocol (RTP) packet or a Transmission Control Protocol (TCP) packet, leading to additional "PCR jitter" caused by such packetization.

The MPEG-2 systems layer strictly times the departure (and arrival) of each TS packet by taking into account the available bit-rate for the transport stream, the buffer size available in compliant decoders, and a tolerable initial latency of presentation. Given widely varying frame sizes, the encoder essentially shapes the transmission through a fixed-size buffer and constrains the peak bit-rate of the transport stream. Larger frames are transmitted over a longer time interval as opposed to smaller ones, leading to a variable frame rate of departure. By assigning the PTS/DTS values as TS packets ingress the fixed-sized buffer and assigning a PCR value as the packets egress the buffer, the encoder controls a model of the receiver buffer, called the Video Buffering Verifier (VBV). The decoder is expected to maintain a buffer, known as the VBV buffer, which is at least as large as the maximum difference between the PCR and DTS values. The amount of time each frame spends in the decoder buffer is referred to as its VBV delay. As long as a decoder adheres to the VBV delay of the first frame (i.e., initial latency), the presentation can then proceed at the frame rate of the original video source. A small VBV buffer size is beneficial both in terms of the amount of memory required at the decoder and the initial latency, though it conflicts with the efficiency of shaping and thus the utilization of the available bit-rate. Relying on the VBV model, traditional video set-top boxes (STBs) only provide for a very small amount of buffering.

The systems layer uses a feedback signal to the compression layer whenever its fixed-size encoder buffer becomes full due to the bit-rate limitation at its egress. This is typically used by the compression layer to reduce the quality of the compressed frames, thereby reducing the number of bits that ingress into the buffer at that instant. If the encoder fixes a maximum quality level, to be used whenever the buffer is not full, the output of the buffer is a variable bit-rate (VBR) transport stream, whose peak rate equals the rate limit of the buffer. Such "capped-quality" peak-rate limited streams are commonly referred to generically as VBR streams. Even though such streams, by definition, do not always transmit at peak rate, a simple multiplexing system that dispatches several such streams on a shared transmission link needs to reserve the peak rate for each stream (i.e., the sum of the peak rates cannot exceed the bandwidth capacity of that transmission link) in order to account for the eventuality that during some instants each stream might need its peak rate so as to adhere to its VBV model. This can lead to a higher transmission cost by under-utilizing the available bandwidth.

Statistical multiplexing of VBR video streams is sometimes used to better utilize the transmission link bandwidth. Statistical multiplexing involves admitting a relatively higher number of transport streams into the link, thus reducing the transmission cost per stream. The sum of the peak rates is allowed to exceed the bandwidth capacity of the link, with the expectation that not every stream would require its peak rate at the same instant. In other words, the "peaks" of some streams coincide with the "valleys" of others in a statistical fashion, resulting in a lower (i.e. lower than peak) "effective bit-rate" for each stream. Special mechanisms are usually provided in the multiplexing system to address the infrequent instants during which the sum of the transmission rates does exceed the available link bandwidth, while still ensuring that the VBV model is not violated. The main issues in designing a statistical multiplexer revolve around the implementation of such mechanisms in a cost-effective fashion. Today, statistical multiplexers are commercially available as stand-alone systems, or as embedded parts of specialty encoders that originate multi-program transport streams (MPTS) and certain quadrature amplitude modulation (QAM) transmission equipment in cable TV networks.

FIG. 1 illustrates an exemplary statistical multiplexing system 100 as illustrated in the art. The multiplexer 102 is in communication with several pre-encoded video transport streams, stream one 104, stream two 106, and stream three 108. The video transport streams are dispatched on a shared output link as multiplexed stream 110. Each stream (e.g., stream one 104) includes multiple TS packets (e.g., the one or more TS packets at time slot one 112A through the one or more TS packets at time slot N 112E). The TS packets are placed in a small buffer (not shown), and a scheduler 114 in communication with the buffers transmits each packet at its specified PCR value. The scheduler 114 can use a wall clock 116 to determine the transmission times of the packets. The wall clock 116 is a counter used by the multiplexer 102 to track the progression of real time, at the desired resolution. Some amount of scheduling jitter is considered acceptable, the size of the small buffer essentially compensating for this jitter. We refer to such a scheduler as a just-in-time (JIT) scheduler. A JIT scheduler can be used to ensure that the VBV model of each stream is not violated as a result of the multiplexing operation.

For each packet J of a multiplexed stream K, a traditional multiplexer determines a departure time D(K,J). In order to adhere to the VBV model, D(K,J) typically equals the normalized PCR value of the packet, calculated by adding its absolute PCR value to the difference between D(K,1) and the PCR value of the first packet. The packet is dispatched to the shared output link when the wall clock equals D(K,J), plus some jitter introduced by the scheduler. This JIT discipline ensures that the decoder buffer does not overflow or underflow as a result of the multiplexing operation. Due to the lack of flexibility in the choice of the departure time, there remain several time slots during which the output link bandwidth remains under-utilized despite the statistical multiplexing gain due to the VBR nature of the multiplexed streams (e.g., time slots 118A, 118C, and 118D). Conversely, several time slots arise during which the output bandwidth becomes oversubscribed, due to conflicting departure times, thus requiring provisions to decrease the number of bits using transrating (e.g., time slot 120).

When the sum of the encoded transmission rates (tightly controlled by the PCR values) exceeds the output link bandwidth, the multiplexer uses a technique referred to as "transrating" (or more generically "transcoding") on selected streams to adequately reduce the number of bits and hence the actual transmission rates. Referring again to FIG. 1, each stream is transmitted at a different rate: stream one 104 is transmitted at rate 122A, stream two 106 is transmitted at rate 122B, and stream three 108 is transmitted at rate 122C. The rate of each stream varies over time. For example, the one or more TS packets at slot one 112A of stream one 104 has an encoded transmission rate 122A of one, the one or more TS packets at slot two 112B has an encoded transmission rate 122A of two, and there is no data to be transmitted at slot three 112C. The peak bit-rate of each stream (i.e., stream one 104 through stream three 108) is a combined rate of two units. The multiplexed stream 110 has a total available bit-rate 124 of four units.

Although the sum of the peak rates can equal up to six units (i.e., because each stream can potentially have a rate of two, so the cumulative rate for a given time slot can equal six), during most time slots, the sum of the rates does not exceed the output link bandwidth due to the fact that the peaks of some stream(s) coincides with the valleys of other(s). For example, at time slot 118A of the multiplexed stream 110, the one or more TS packets of stream one 104 at slot one 112A with a rate 122A of one is multiplexed with the one or more TS packets at slot one 112A from stream three 108 with a rate 122C of one (there is no data for stream two at slot one 112A). The resulting multiplexed stream 110 at slot 118A has a cumulative rate 124 of two. Similarly, the multiplexed stream at slot 118B has a cumulative rate 124 of four (i.e., the sum of rate 122A two from stream one 104, rate 122B one from stream two 106, and rate 122C one of stream three 108 at slot two 112B).

However, at the transrating interval 120, the cumulative rate of the three streams is five, which is one too large for the total allowance of a rate 124 of four for the multiplexed stream 110. Consequently, transrating is performed at the transrating interval 120. The transrating interval shows the time slot during which the available bit-rate cannot accommodate the encoded rates.

Transrating is extremely compute-intensive, as it typically requires re-compressing the frames, by adjusting the instantaneous quality level. Quality level adjustments can be handled by video encoders, usually at no additional cost, making them suitable for creating such statistical multiplexes. Unfortunately, however, there are no provisions in the art to cost-effectively create multiplexes of arbitrarily selected streams (e.g., a mix of live TV and on-demand streams) in the network, from pre-encoded video, at high scale. Moreover, video content owners prefer not to adversely change video quality once the stream leaves the encoder.

Other approaches for statistically multiplexing video streams involve smoothing the rate changes of each individual stream at the input to the network to make their statistical combination on shared network resources more desirable. This approach offers some improvement in network resource efficiency but does not avail itself of the opportunity to tradeoff the specific delivery timing requirements of individual packets from different streams. A larger VBV buffer could be added to the decoder to reduce the required peak bit-rate of the transport stream. However, for the same quality level, it still produces a VBR stream (with valleys) without addressing the efficient sharing of the available bit-rate of the shared link.

Statistical multiplexing is commonly found in data networks as a means to allocate "average" or "sustained" bit-rates to data flows, as opposed to peak bit-rates, so as to better utilize network bandwidth. Scheduling techniques such as Head of Line Priority, Weighted Round Robin (WRR), Earliest Deadline First (EDF) and Weighted Fair Queueing (WFQ) are used to efficiently multiplex data flows onto output links of switches, routers and other networking equipment, without having to reserve the peak bit-rate of each flow. Such schemes scale relatively better, since statistical multiplexing becomes an integral part of the scheduling discipline itself without provisions for any special mechanisms to compensate for instants when the sum of the desired transmission rates exceeds the output link bandwidth. For example, when a video file is downloaded using the file transfer protocol (FTP), as opposed to being streamed in a just-in-time fashion, such a download benefits from data network statistical multiplexing and better utilizes network bandwidth. However, such a download service represents the opposite extreme, typically plagued by frequent underflows and/or excessive start-up delay at the receive buffer due to its lack of regard to the presentation timing requirements of video. There are no adequate provisions to systematically apply such scheduling disciplines to time-sensitive delivery of video transport streams.

SUMMARY OF THE INVENTION

The techniques described herein provide methods and apparatuses for statistically multiplexing variable bit-rate compressed video streams in a scalable fashion. Such statistical multiplexing enables the transmission of a larger number of video streams over constrained bandwidth links, than otherwise possible, in a very cost-effective fashion. In some embodiments, additional decoder buffering can be leveraged to transmit packets ahead of their predetermined departure time. Without loss of generality, the invention is described in the context of MPEG encoded video streams with the knowledge that it is equally applicable to other video encoding techniques that rely on variable bit-rate timed delivery.

In one aspect, there is a method. The method includes computing a deadline of a packet of a compressed video stream based on a program clock reference value of the packet. The method further includes sorting a plurality of packets, which includes the packet, based on deadlines corresponding to the packets. A next packet is selected from the sorted plurality of packets, the next packet having a corresponding deadline nearest to a system clock time. The next packet is transmitted in a multiplexed stream.

In another aspect, there is a method. The method includes determining a first priority group and a second priority group for compressed video streams. A first packet of a first compressed video stream is selected from the first priority group, the first packet having a first deadline, the first deadline being an earliest deadline of the first priority group. The method further includes determining whether to transmit the first packet based on the first deadline and a system clock time. If the first packet is to be transmitted, the first packet is transmitted. If the first packet is not to be transmitted, a second packet from a second compressed video stream is selected from the second priority group, the second packet having a second deadline, the second deadline being an earliest deadline of the second priority group. The method further includes transmitting the second packet before the second deadline.

In another aspect, there is a computer program product. The computer program product is tangibly embodied in a computer readable medium. The computer program product includes instructions being operable to cause a data processing apparatus to compute a deadline of a packet of a compressed video stream based on a program clock reference value of the packet. The computer program product further include instructions being operable to sort a plurality of packets, which includes the packet, based on deadlines corresponding to the packets. A next packet is selected from the sorted plurality of packets, the next packet having a corresponding deadline nearest to a system clock time. The computer program product further include instructions being operable to transmit the next packet.

In another aspect, there is a computer program product. The computer program product is tangibly embodied in a computer readable medium. The computer program product includes instructions being operable to cause a data processing apparatus to determine a first priority group and a second priority group for compressed video streams. The computer program product further include instructions being operable to select a first packet of a first compressed video stream from the first priority group, the first packet having a first deadline, the first deadline being an earliest deadline of the first priority group. The computer program product further includes instructions being operable to determine whether to transmit the first packet based on the first deadline and a system clock time. If the first packet is to be transmitted, the first packet is transmitted. If the first packet is not to be transmitted, a second packet is selected from a second compressed video stream from the second priority group, the second packet having a second deadline, the second deadline being an earliest deadline of the second priority group. The computer program product further includes instructions being operable to transmit the second packet before the second deadline.

In another aspect, there is a system. The system includes a scheduler configured to compute a first deadline of a first packet of a first compressed video stream based on a program clock reference value of the first packet. The scheduler is further configured to sort a plurality of packets, which includes the first packet, based on deadlines corresponding to the packets. The scheduler is further configured to select a next packet from the sorted plurality of packets, the next packet having a nearest deadline. The system includes a transmitter in communication with the scheduler configured to transmit the next packet.

In another aspect, there is a system. The system includes a first scheduler in communication with a first priority group configured to select a first packet of a first compressed video stream from the first priority group, the first packet having a first deadline, the first deadline being an earliest deadline of the first priority group. The system includes a second scheduler in communication with a second priority group configured to select a second packet from a second compressed video stream from the second priority group, the second packet having a second deadline, the second deadline being an earliest deadline of the second priority group. The system includes a multiplexer in communication with the first scheduler and the second scheduler, the multiplexer configured to determine the first priority group and the second priority group for compressed video streams. The multiplexer is further configured to determine whether to transmit the first packet based on the first deadline and a system clock time. The system includes a transmitter in communication with the multiplexer, the transmitter configured to transmit the first packet when the multiplexer determines the first packet is to be transmitted. The transmitter is further configured to transmit the second packet before the second deadline when the multiplexer determines the first packet is not to be transmitted.

In another aspect, there is a system. The method includes means for computing a deadline of a packet of a compressed video stream based on a program clock reference value of the packet. The method includes means for sorting a plurality of packets, which includes the packet, based on deadlines corresponding to the packets. The method includes means for selecting a next packet from the sorted plurality of packets, the next packet having a corresponding deadline nearest to a system clock time. The method includes means for transmitting the next packet.

In another aspect, there is a system. The method includes means for determining a first priority group and a second priority group for compressed video streams. The method includes means for selecting a first packet of a first compressed video stream from the first priority group, the first packet having a first deadline, the first deadline being an earliest deadline of the first priority group. The method includes means for determining whether to transmit the first packet based on the first deadline and a system clock time.

The method includes means for transmitting the first packet if the first packet is to be transmitted. The method includes means for selecting a second packet from a second compressed video stream from the second priority group if the first packet is not to be transmitted, the second packet having a second deadline, the second deadline being an earliest deadline of the second priority group. The method includes means for transmitting the second packet before the second deadline.

In other examples, any of the aspects above can include one or more of the following features. One or more packets associated with a live compressed video stream are received. The one or more packets associated with a live compressed video stream are buffered in a first buffer. One or more packets associated with a stored compressed video stream are received. The one or more packets associated with the stored compressed video stream are buffered in a second buffer.

In some examples, a new packet is received associated with the live compressed video stream. The first buffer is determined to be full. An electronic notification is generated. A second packet of the live compressed video stream is selected and discarded from the first buffer. The one or more packets associated with the stored compressed video stream are buffered by obtaining the one or more packets associated with the stored compressed video stream when the second buffer is below a predefined threshold for a fullness state of the second buffer. De-queuing the first buffer, the second buffer, or both, is prevented until a predefined threshold for a corresponding fullness state is reached.

In other examples, the deadline is computed based on a normalized program clock reference value, which in some examples is associated with the packet. The normalized program clock reference value is computed based on adding the program clock reference value of the packet to a difference between a deadline of an initial packet of the first compressed video stream and a program clock reference value of the initial packet.

In some examples, the program clock reference is a PCR of an MPEG TS packet, a time stamp of an RTP packet, or any combination thereof. The next packet is transmitted at a time earlier than a departure time established during encoding corresponding to the next packet. A program clock reference value is modified in the next packet with a modified departure time. It is determined if the next packet departs at a system clock time greater than the deadline corresponding to the next packet plus a maximum jitter. An electronic notification is sent. An adjusted deadline is calculated, wherein the adjusted deadline is based on the deadline plus the maximum jitter.

In other examples it is determined whether the next packet adheres to a rate regulation prior to transmitting the next packet. The rate regulation is based on a difference between a departure time of the second packet and the second deadline, TCP feedback, available downstream bandwidth, a network structure, or any combination thereof. Transmission of the next packet is delayed based on the rate regulation determination. It is determined the second packet does not adhere to the rate regulation. A third packet is selected from the second priority group, the third packet having a third deadline, the third deadline being a second earliest deadline of the second priority group.

In some examples, it is determined whether to transmit the first packet based on whether the first deadline is less than or equal to the system clock time. It is determined whether the second packet departs when the system clock time is greater than the second deadline plus a maximum jitter. An electronic notification is sent.

In other examples, it is determined the second packet adheres to a rate regulation. The rate regulation is based on a difference between a departure time of the second packet and the second deadline, TCP feedback, available downstream bandwidth, a network structure, or any combination thereof.

In some examples, it is determined the second packet does not adhere to the rate regulation. A third packet is selected from the second priority group, the third packet having a third deadline, the third deadline being a second earliest deadline of the second priority group.

In some examples, there is a first buffer and a second buffer. A receiver in communication with the first buffer and the second buffer is configured to receive one or more first packets of a live compressed video stream. The receiver is further configured to buffer the one or more first packets in the first buffer. The receiver is further configured to retrieve one or more second packets of a stored compressed video stream. The receiver is further configured to buffer the one or more second packets in the second buffer.

In other examples, a decoder buffer in communication with the transmitter is configured to buffer the next packet, wherein a size of the receiver buffer is greater than a standard buffer size used to support transmitting one or more packets of the first compressed video stream at corresponding PCR values.

In some examples, the first scheduler is a just-in-time (JIT) scheduler. The second scheduler is an earliest-deadline-first (EDF) scheduler. The first scheduler and second scheduler are earliest-deadline-first (EDF) schedulers. The first priority group includes one or more live compressed video streams, one or more stored streams destined to decoders with limited buffering, or any combination thereof. The second priority group includes one or more stored compressed video streams.

In other examples, a regulator in communication with the second priority group and the second scheduler is configured to determine whether the second packet adheres to a rate regulation. The regulator determines the second packet does not adhere to a rate regulation. The regulator selects a third packet from the second priority group, the third packet having a third deadline, the third deadline being a second earliest deadline of the second priority group.

The statistical multiplexing of compressed video stream techniques described herein can provide one or more of the following advantages. An advantage is the ability to statistically multiplex arbitrarily selected VBR video streams in a highly scalable and cost-effective fashion. On-demand multiplexes can be created in a network as opposed to pre-determined multiplexes at the encoding source. Additionally, the systems and methods multiplex live video streams received at the inputs of the multiplexer apparatus and video streams that reside in attached storage. A larger number of compressed video streams can be transmitted on a fixed bandwidth link without reserving the peak bit-rate of each stream, thereby reducing the transmission cost per stream.

Another advantage is the systems and methods achieve superior scale by systematically applying the EDF discipline to transmit the packets of the multiplex. The deadline itself is based on the encoded timing (PCR) of the TS packet. Advantageously the system and method avoid the compute-intensive transrating technique, thereby also ensuring that there is no loss of quality in the pre-encoded video. By sending certain TS packets before its deadline, it gains better efficiency in balancing the peaks and valleys of individual stream bit-rates (e.g., unlike a JIT scheduler that is constrained by the VBV model of each stream and can only rely on the statistical coincidence of such peaks and valleys). Due to this increase in efficiency, the probability of a TS packet missing its deadline, which would result in an underflow at the decoder, becomes diminishingly small. As a fail safe, any such underflow can be reported to, for example, the admission control component in the multiplexer, which may then decide to reduce the number of multiplexed streams to virtually eliminate the possibility of decoder buffer underflow.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In general overview, a corresponding deadline of each packet in a plurality of packets of a compressed video stream is computed based on a program clock reference value of the packet. The plurality of packets are sorted based on the deadlines corresponding to the packets. A packet is selected from the sorted plurality of packets, where the next packet has a corresponding deadline nearest to a system clock time. The selected packet is transmitted.

In some embodiments, a first priority group and a second priority group are determined for compressed video streams. A first packet of a first compressed video stream is selected from the first priority group, where the first packet has a first deadline. The first deadline is an earliest deadline of the first priority group. It is determined whether to transmit the first packet based on the first deadline and a system clock time. If the first packet is to be transmitted, the first packet is transmitted. If the first packet is not to be transmitted, a second packet is selected from a second compressed video stream from the second priority group. The second packet has a second deadline. The second deadline is an earliest deadline of the second priority group. The second packet is transmitted before the second deadline. In some embodiments, it is determined whether the second packet adheres to a rate regulation.

Figure 1:
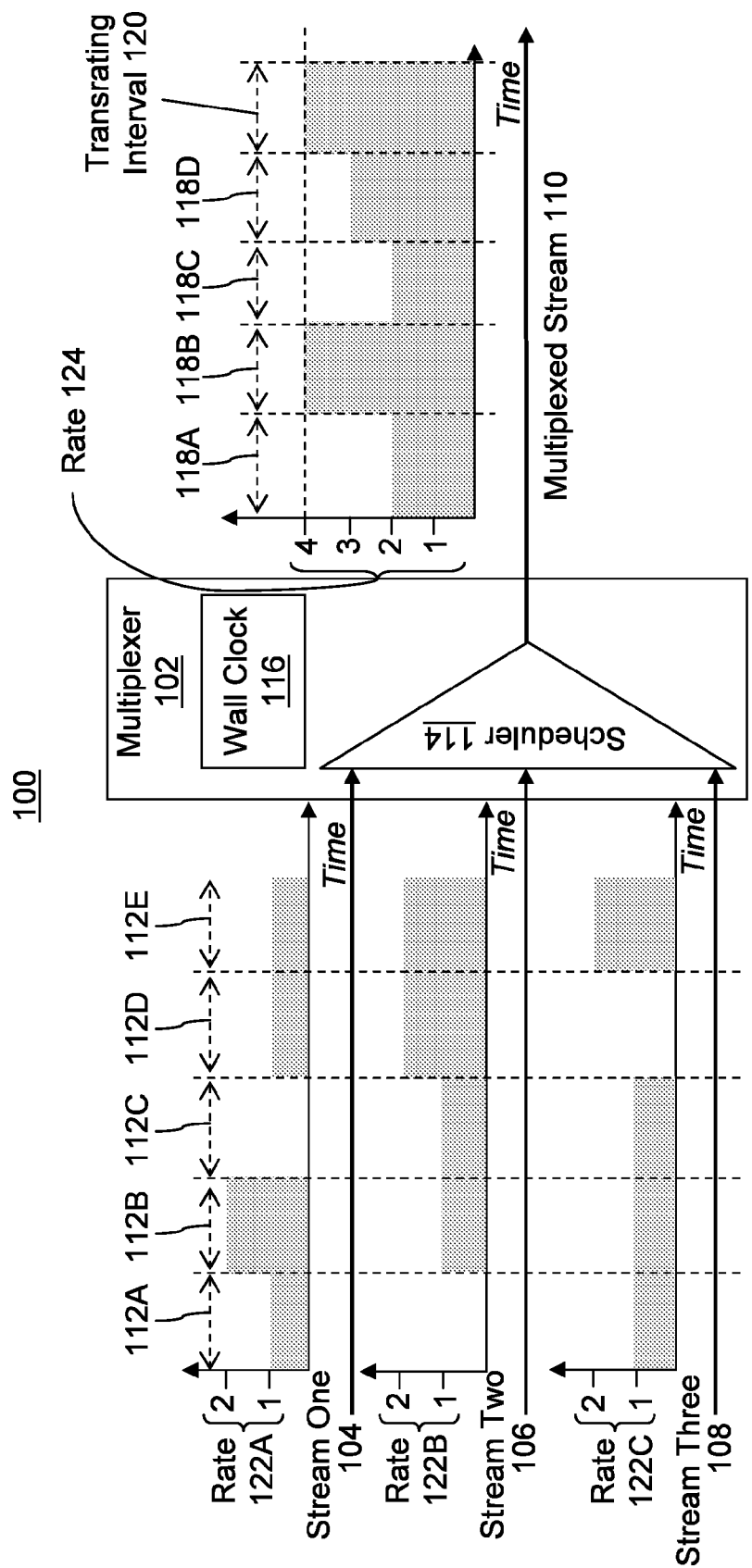
FIG. 1 shows a multiplexer as known in the art.
Figure 2:
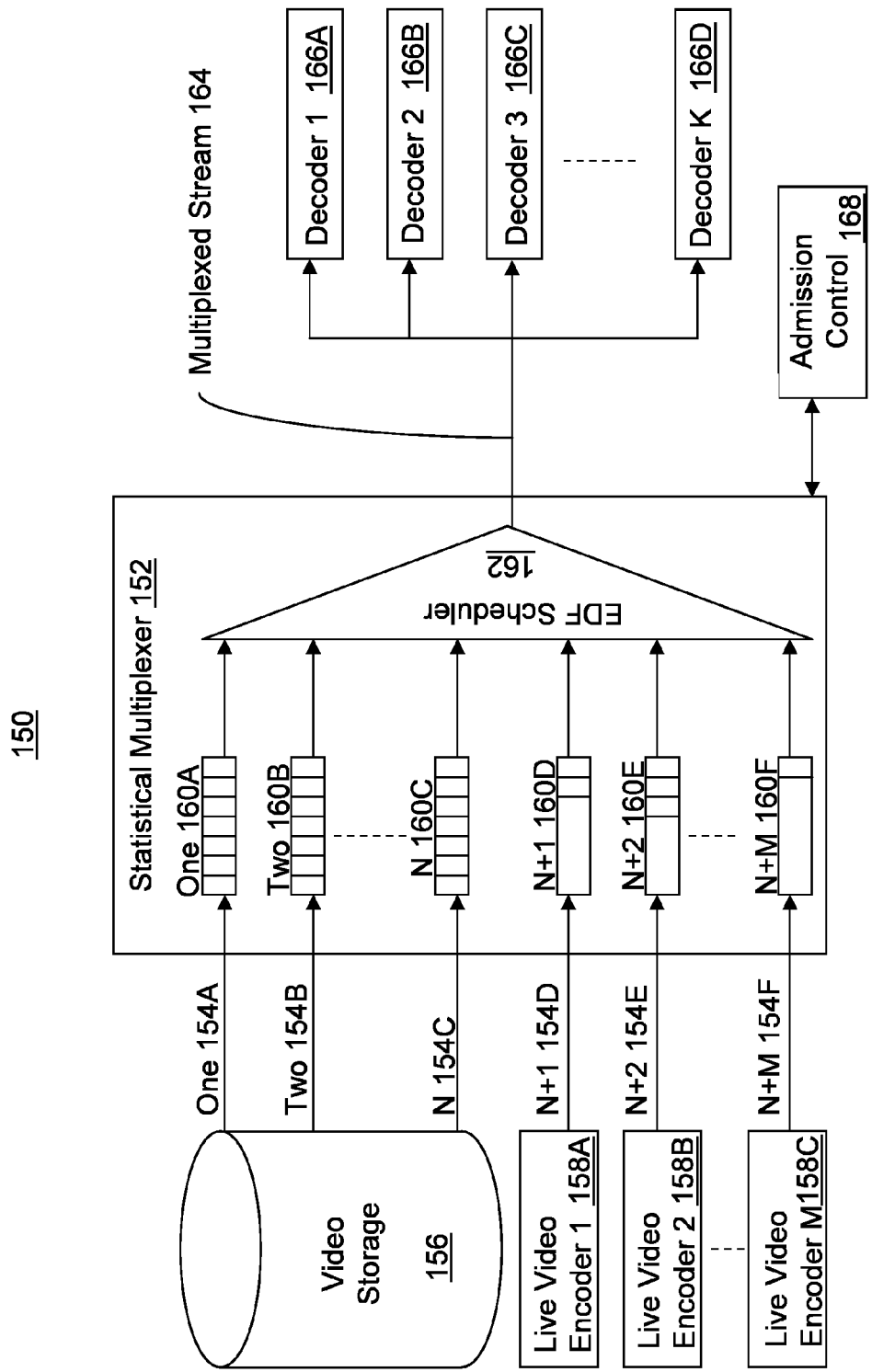
FIG. 2 shows a statistical multiplexing system for multiplexing compressed video streams.

FIG. 2 shows a statistical multiplexing system 150 for multiplexing compressed video streams. The statistical multiplexer receives stream one 154A through stream N+M 154F. Stream one 154A through stream N 154C are received from a video storage device 156 (e.g., a persistent device such as persistent memory, disk array, etc.). Stream N+1 154D through stream N+M 154F are received from live video encoder one 158A through live video encoder M 158C, respectively. The statistical multiplexer 152 includes stream buffer one 160A through stream buffer N+M 160F, collectively referred to as stream buffers 160. The stream buffers 160 are in communication with the scheduler 162. The scheduler 162 outputs a multiplexed stream 164. The statistical multiplexer 152 is in communication with one or more decoders. The multiplexed stream 164 is received by one or more decoders (e.g., one or more of decoder one 166A through decoder K 166D), generally referred to as the decoders 166. Admission control 168 is in communication with the statistical multiplexer 152.

In some examples, for each stream, TS packets are either pre-fetched or stored upon receipt in a stream buffer (e.g., depending on a live or stored stream). The buffer is accessed by the scheduler 162, which selects the appropriate TS packets to multiplex into the multiplexed stream 164. The multiplexed stream 164 is transmitted to one or more of the decoders 166. For example, TS packets associated with stream one 154A can be pre-fetched by the statistical multiplexer 152. The statistical multiplexer 152 stores the TS packets in stream buffer 160A. The scheduler 162 determines when to multiplex TS packets from stream buffer 160A based on various factors (e.g., the deadline of the TS packet and an associated jitter). The statistical multiplexer 152 can include a rate regulator (not shown, but would be similar in operation to 522 of FIG. 8) for the streams from video storage 156. The regulator can use various factors (e.g., a difference between a departure time of the second packet and the second deadline, TCP feedback, available downstream bandwidth, a network structure, or any combination thereof). If, for example, the rate regulator determines a TS packet from stream buffer one 160A should not yet be sent, the statistical multiplexer can wait to transmit the TS packet. The held TS packet can be held back in stream buffer one 160A. The scheduler 162 can determine a next TS packet to transmit instead of the held TS packet.

The statistical multiplexer 152 includes a stream buffer for each stream to facilitate pre-fetching TS packets (e.g., requesting TS packets for stream one 154A from the video storage 156 to buffer into stream buffer one 160A). For stored streams (i.e., streams from the video storage 156), the multiplexer (e.g., the statistical multiplexer 152) can adjust the buffer size to compensate for the latency in retrieving packets from the attached video storage. For example, since entire pre-encoded video programs can be resident in the video storage 156, stream one 154A through stream N 154C can essentially benefit from unlimited pre-fetch capability. The multiplexer can continuously replenish the stream buffers whenever the buffers are not full (e.g., based on the current size of a stream buffer). For the live streams (i.e., stream N+1154D through stream N+M 154F), the buffer size may not be as critical to the maximum pre-fetch capability. For example, the multiplexer may replenish the stream buffers (e.g., stream buffer N+1160D through stream buffer N+M 160F) only when new TS packets arrive for the respective streams. The relative packet arrival time for each stream can be restricted by the timing control of the live video encoder (e.g., live video encoder one 158A, which is external from the statistical multiplexer 152). This limited pre-fetch capability may lower the statistical multiplexing gain (i.e., the effective bit-rate of the live streams may end up higher than that of a comparable stored stream). While the limited pre-fetch capability may increase the effective bit-rate, a large stream buffer size can increase the delay with respect to the arriving live stream. At each time instant, for example, the scheduler 162 can pick a TS packet with the lowest deadline, using a sorting data-structure (not shown), from the corresponding stream buffer for transmission on the shared output link. The admission control 168 can monitor incidences of decoder underflow. The admission control 168 can, for example, limit the number of streams that compose the multiplex. If, for example, a new packet associated with a live compressed video stream is received and the buffer is full, an electronic notification can inform the admission control of the occurrence and discard a packet from the buffer to make room for the incoming packet. In general, individual streams inside the multiplex may be destined to different decoders (e.g., decoder one 166A, which is external from the statistical multiplexer 152).

In some examples, if a new stream is added to the statistical multiplexer 152, a stream buffer is initialized for the new stream. The multiplexer (e.g., using feedback from the scheduler 162) can disable dequeuing from the buffer allocated to the new stream until sufficient packets are pre-fetched from the new stream. For example, if the buffer is capable of holding twenty TS packets, the scheduler 162 does not dequeue packets from the buffer until the buffer stores ten TS packets for the new stream. Both the size of the stream buffers and the activation size can be configured through system parameters. The statistical multiplexer can enqueue TS packets into stream buffers 160 asynchronously while dequeueing and dispatching TS packets.

Figure 3:
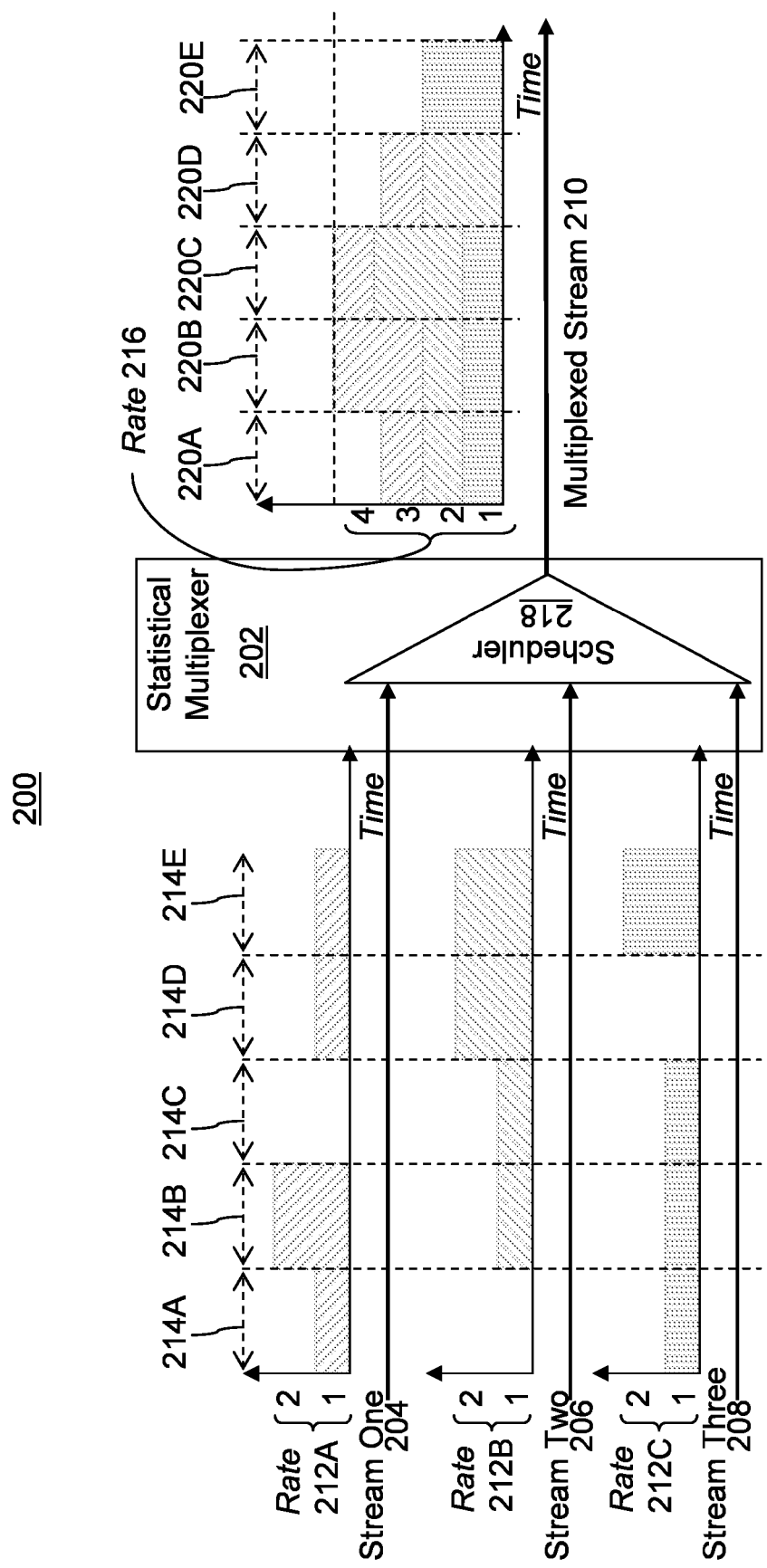
FIG. 3 shows a statistical multiplexer for compressed video streams.

FIG. 3 is a diagram 200 showing statistical multiplexer 202 operating on compressed video streams. Compressed video stream one 204, compressed video stream two 206, and compressed video stream three 208 are in communication with the statistical multiplexer 202. Although FIG. 3 shows three compressed video streams, any number of compressed video streams can be received at the statistical multiplexer 202. The statistical multiplexer 202 outputs a multiplexed stream 210. In this example, the maximum rate allowed for each stream (e.g., the maximum of rate 212A, 212B, or 212C) is two. Each compressed video stream includes one or more TS packets. For example, stream one 204 includes one or more TS packets with a value of rate 212A of one at slot 214A, one or more TS packets with a value of rate 212A of two at slot 214B, no TS packets at slot 214C, and one or more TS packets with a value of rate 212A of one for slots 214D and 214E.

The multiplexed stream 210 has a maximum value of rate 216 of 4. The multiplexed stream 210 includes TS packets from stream one 204, stream two 206, and stream three 208. The statistical multiplexer 202 calculates a departure time for each TS packet of the three streams. For each TS packet $J_x$ from TS packets $J_1$ through $J_n$ of a multiplexed stream K (e.g., stream one 204, stream two 206, and stream three 208), a deadline time $D(K,J_x)$ is calculated. The deadline time $D(K,J_x)$ may also referred to herein as the departure corresponding to the packet $J_x$. $D(K,J_x)$ typically equals the normalized PCR value of packet $J_x$, calculated by adding the absolute PCR value of $J_x$ to the difference between $D(K,J_1)$ and the PCR value of the first packet $J_1$. The scheduler 218 can transmit one or more TS packets (e.g., $J_1$ through $J_5$) before its corresponding departure time $D(K,J_x)$. This can, for example, fill the valleys that remain under-utilized by a JIT scheduler.

Referring to FIG. 3, the scheduler 218 transmits the one or more TS packets from stream one 204, stream two 206, and stream three 208. The scheduler 218 can, for example, better utilize the available rate 216. The scheduler 218 can minimize transrating. The TS packets of each stream have different shading patterns to indicate when the scheduler 218 transmitted the TS packets. At the first slot 220A, the scheduler 218 transmitted one or more a TS packets of rate one from stream one 204, stream two 206, and stream three 208. The one or more TS packets of rate one transmitted from stream two 206 were transmitted one slot earlier than their assigned slot. This can be facilitated by, for example, pre-fetching the TS packets for stream two 206. If at a later point the combined rates of the packets from each stream are too large for the output link (e.g., the sum of the TS packets exceeds the maximum value of rate 216), the scheduler 218 can wait to send the packet from stream two 206.

At slot 220B, one or more TS packets of rate two are transmitted from stream one 204, and one or more TS packets of rate one are transmitted from stream two 206 and from stream three 208. At slot 220B, the scheduler 218 has efficiently utilized a rate of four for the multiplexed stream 210. The scheduler 218 transmits one or more TS packets of rate one from stream one 204 and stream three 208, and one or more TS packets of rate two from stream two 206 at slot 220C. Again, the scheduler 218 has allocated the full bandwidth available for multiplexed stream 210 at slot 220C. The one or more TS packets from stream one 204 at slot 220C were transmitted one slot early. All of the remaining TS packets for streams one 204 through stream three 208 are transmitted in slots 220D and 220E without transrating.

The compressed video streams can be from stored video feeds, live video feeds, or both. For example, stream one 204 can be a live news feed from a local area news team, stream two 206 can be a motion picture stored on a remote storage device (e.g., stored on a video server), and stream three 208 can be a live video feed of a sports event. Based on the type of compressed video stream (i.e., stored or live), the statistical multiplexer 202 may not be able to pre-fetch TS packets of the video stream. For example, the statistical multiplexer 202 can not pre-fetch TS packets of a live video feed from stream one 204. If stream two 206 is a stored motion picture, the statistical multiplexer 202 can pre-fetch TS packets of stream two 206 to fill up a buffer (not shown) in the statistical multiplexer 202. As indicated, pre-fetching can allow the statistical multiplexer to transmit TS packets of stream two 204 before their computed deadline for departure. The statistical multiplexer 202 can utilize unused bandwidth in the multiplexed stream 210.

By sending a sufficient number of packets ahead of its desired departure time, the statistical multiplexer 202 can virtually eliminate future instants during which the output link bandwidth may become over-subscribed. The scheduler 218 can use $D(K,J)$ as a deadline, rather than the desired departure time. Using a deadline can, for example, denote a relative urgency to transmit the packet rather than an exact instant to transmit the packet. Using a sorting data-structure (not shown) in the statistical multiplexer 202, packets can be sent as early as possible, in a work conserving fashion, in increasing order of deadlines. Transrating intervals can be prevented by sending packets ahead of their initially scheduled departure time by using a deadline. For example, a TS packet R can be transmitted before the calculated deadline $D(K,R)$ and up to the deadline $D(K,R)$. Transmitting R at the deadline $D(K,R)$ can be the same time as the deadline of packet R. Further, the scheduler 218 can better utilize the earlier instants when the multiplexed stream 210 would otherwise remain under-utilized. If, for example, a decoder (not shown) contains a sufficiently large buffer, it can significantly alleviate VBV buffer overflow. The primary goal of the multiplexer can then be the elimination of decoder buffer underflow.

Since the probability of over-subscription can become diminishingly small, no transrating is necessary. Decoder buffer underflow can be mitigated with, for example, a closed loop with an admission control component that can limit the number of multiplexed streams, if underflows persist. For stored compressed video streams, decoder buffer underflow may not be an issue as long as the underflows are infrequent. However, for live streams each freeze frame may cause a "backward drift" with respect to the original stream. To enable sending packets ahead of their deadlines, the statistical multiplexer 202 can include stream buffers to pre-fetch packets and keep them ready for the scheduler 218. Again, such pre-fetching is easily achieved for stored video streams, since the entire pre-encoded video is available in the attached storage. However, the amount of pre-fetching can be limited in the case of live streams, which must be delayed in order to fill the stream buffer. A larger VBV buffer can be used at the decoder to further facilitate transmitting TS packets ahead of their associated deadline. Using a larger buffer at the decoder does not contribute any additional initial latency. Using, for example, an EDF-type structure can equalize the amount of time that the latest transmitted packet of each stream is dispatched ahead of its deadline. A new stream can get priority until it "catches up" with the other streams in the multiplex. A new stream can get sufficiently ahead and retain the initial latency (VBV delay of the first frame) specified by the encoder.

The time slots (e.g., time slots 214A through 214E) and the integer rate values (e.g., one and two for rate 212A of stream one 204) of FIG. 3 are simplified for illustrative purposes. The rate of an encoded stream (e.g., the rate 212A of stream one 204, rate 212B of stream two 206, rate 212C of stream three 208, and rate 216 of the multiplexed stream 210) may not be constant and/or delineable over a certain time period. For example, the rate of an encoded stream can change continuously without certain time slot boundaries. One or more TS packets can be transmitted at a rate during a time period.

Figure 4A:
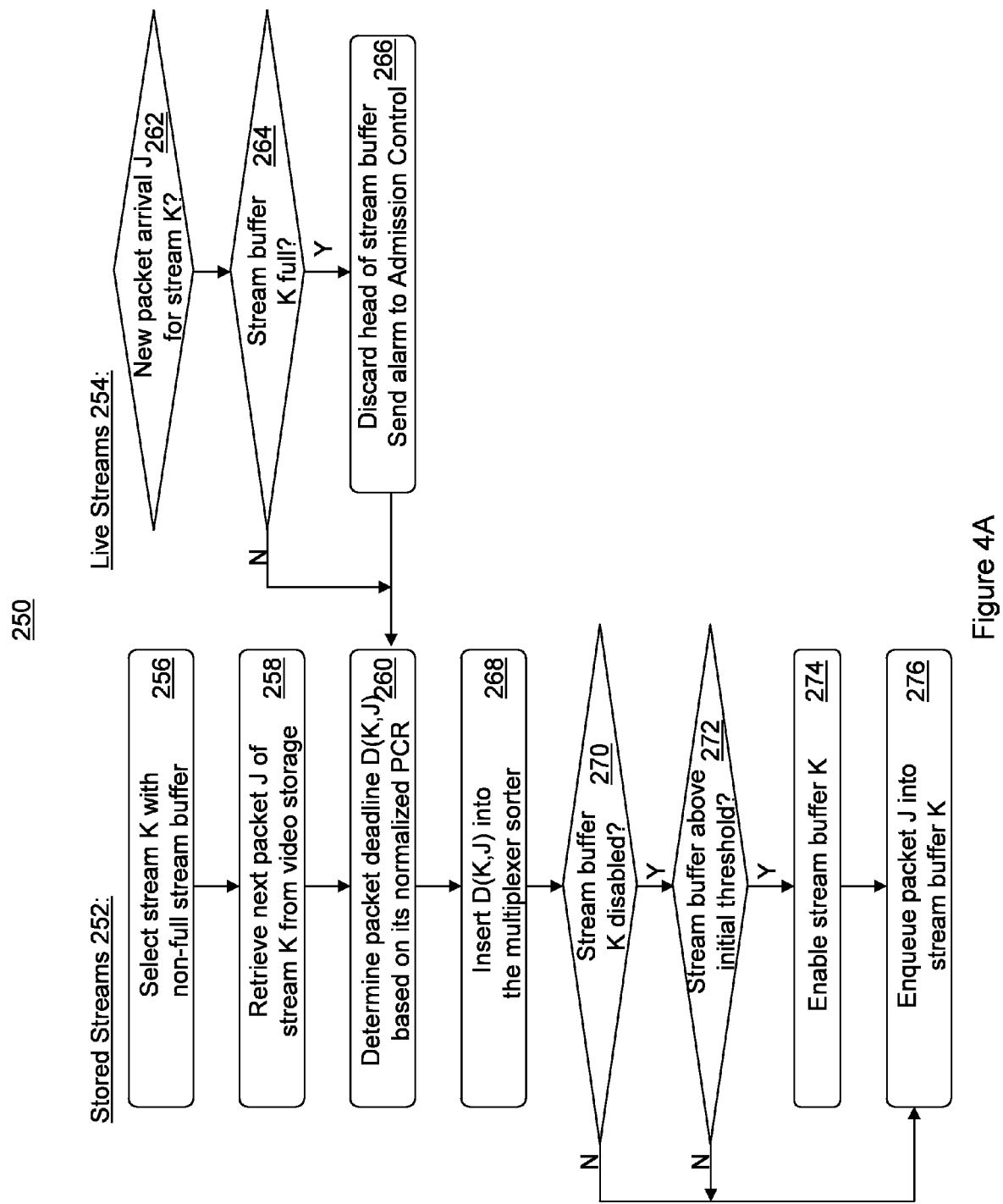
FIG. 4A shows a flow diagram of the enqueue process for a statistical multiplexer.

FIG. 4A shows a flow chart of the enqueue process 250 for a statistical multiplexer. The enqueue process 250 operates on stored video streams 252 and live video streams 254. For stored video streams 252, a stream K is selected 256 with available space in the stream buffer. A next packet J of stream K is retrieved 258 from video storage. A packet deadline D(K,J) is determined 260 for packet J. The packet deadline can be based on the normalized PCR value of packet J. For live streams 254, it is determined 262 that a new packet J arrived for stream K. It is determined 264 if the stream buffer for K is full. If the stream buffer is full, the head of the stream buffer is discarded 266. An alarm (e.g., an electronic notification) can be sent to, for example, admission control 168 of FIG. 2 indicating the head of the stream buffer was discarded. If the stream buffer is not full, the packet deadline D(K,J) is determined 260 based on the normalized PCR value of packet J.

Referencing FIG. 3, the statistical multiplexer 202 can compute the deadline, for example, based on the program clock reference value added to a difference between a deadline of an initial packet of the first compressed video stream and a program clock reference value of the initial packet. The program clock reference can be a PCR of an MPEG TS packet, a time stamp of an RTP packet, or any other time reference for packets of a video stream. The multiplexer (e.g., the statistical multiplexer 202) can insert 268 the deadline D(K,J) into a multiplexer sorter. If the stream buffer for stream K is disabled 270, the multiplexer determines 272 if the stream buffer is above an initial threshold. If the stream buffer K is above the initial threshold, the stream buffer K is enabled 274. The multiplexer enqueues 276 packet J into stream buffer K. For descriptive purposes with FIG. 4A, both the stored streams 252 and live streams 254 operate on stream K with packet J. Those skilled in the art can appreciate that stored streams 252 can differ from the live streams 254. The multiplexer can iteratively perform the process of selecting 256 a stream with a non-full buffer on all the stored streams 252 of the system continuously. For example, the multiplexer can continuously retrieve packets for all the stored streams 252. The initial threshold required to enable a stream buffer can be configured by the system. For example, an initial threshold can be based on the buffer size, the deadlines of the packets in the stream buffer, and/or the like. If the stream has been recently initialized and remains disabled, an enqueue operation may result in enabling the stream if sufficient number of packets have been enqueued.

Packets can be continuously retrieved using any suitable selection criteria to determine the order of retrieval from the video storage (e.g., the video storage 156 of FIG. 2). Retrieval can be limited by the I/O bandwidth of the storage device. A transmission of a TS packet after its deadline can result in an underflow at the decoder. An alarm can be used, for example, to communicate the late transmission to the admission control component. The admission control component can adjust the number of streams (both stored and live) used within the system based on the alarm.

Figure 4B:
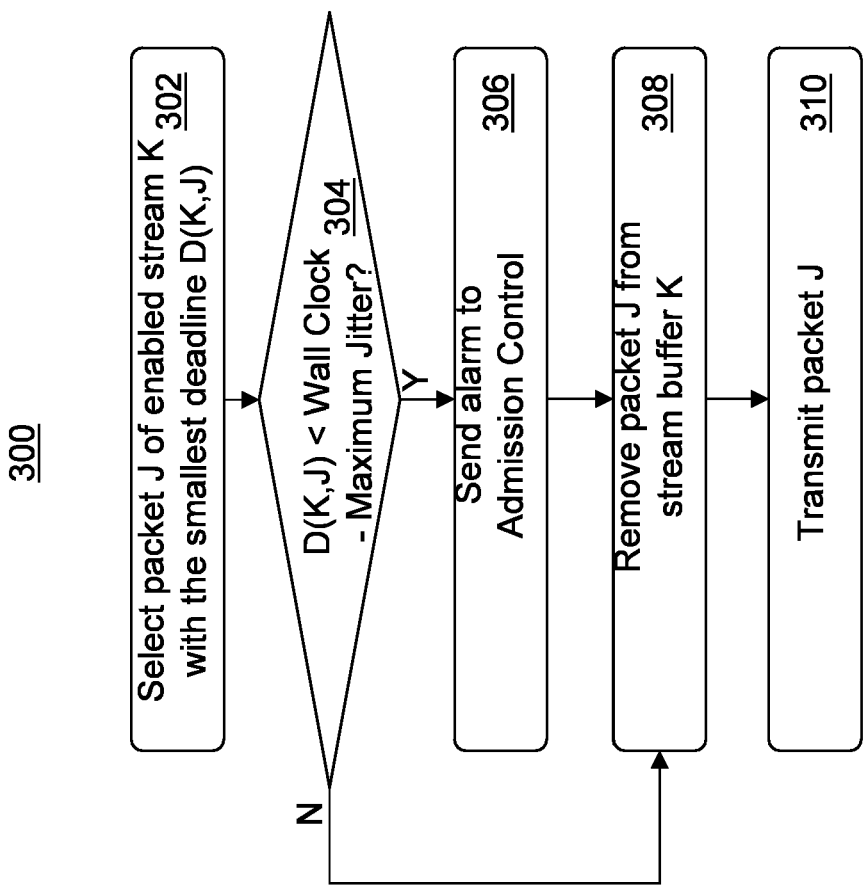
FIG. 4B shows a flow diagram of the dequeue process for a statistical multiplexer.

FIG. 4B shows a flow chart 300 of the dequeue process for a statistical multiplexer. Enqueued packet J is selected 302 (e.g. by a scheduler component) with the lowest deadline D(K,J). The selection can be performed with the sorting data-structure. The deadline is compared 304 with the current value of the wall clock, while compensating for the maximum scheduling jitter. The terms wall clock and system clock can be used interchangeably. The comparison can detect whether the packet might arrive too late at the decoder (i.e., cause a decoder buffer underflow). If a potential underflow is determined, an alarm is sent 306 to the admission control component. The selected packet J is removed 308 from the stream buffer K. The packet J is dispatched 310 to the output link. The scheduler can adjust the departure time with respect to the timing specified by the video encoder. For example, the PCR value in the TS packet header can be re-stamped, as part of the transmission, to accurately reflect the modified departure time. Packet J can be transmitted at a time earlier than the originally scheduled departure time for the decoder (e.g., earlier than a PCR value of an MPEG TS packet) and may be transmitted after the originally scheduled deadline but generally no later than the deadline plus a maximum jitter to ensure no underflow at the decoder.

For example, assume a packet J is selected with a deadline of 07:00:00:000 a.m. ET. If the wall clock reads 06:59:59:900 a.m., then the packet J can be transmitted and still meet its deadline of 07:00:00:000 a.m. ET. If the known jitter of the system is 00:00:00:200, then the deadline can be adjusted based on the jitter. Adjusting the deadline is computed as the sum of the current deadline D(K,J) and the known jitter, which is equal to 07:00:00:200 a.m. ET. Comparing the adjusted deadline of packet J against the wall clock time, the adjusted deadline is less than the wall clock time by 00:00:00:300. If the adjusted deadline is greater than the wall clock, this relationship can indicate packet J might reach the receiver or decoder late, causing a decoder buffer underflow. As a result, packet J can be transmitted a little late (up to the maximum jitter) without underflowing the decoder buffer.

Normalized PCR values can be used when calculating the deadline. For example, instead of using the current time (e.g., of the system), a counter-type setup can be used. The first packet which arrives for stream K can start the counter. Assume, for example, a packet J has a deadline D(K,J) equal to 38, the wall clock time is 32, and the known jitter is 2. Using the same mathematical calculations as above, the adjusted deadline is 40. The deadline of packet J is greater than the adjusted wall clock time by 8. The calculation shows packet J will be transmitted from the multiplexer (i.e., and received by the decoder) without violating the deadline. This can ensure the packet does not arrive to the decoder late enough to cause an underflow.

Figure 5:
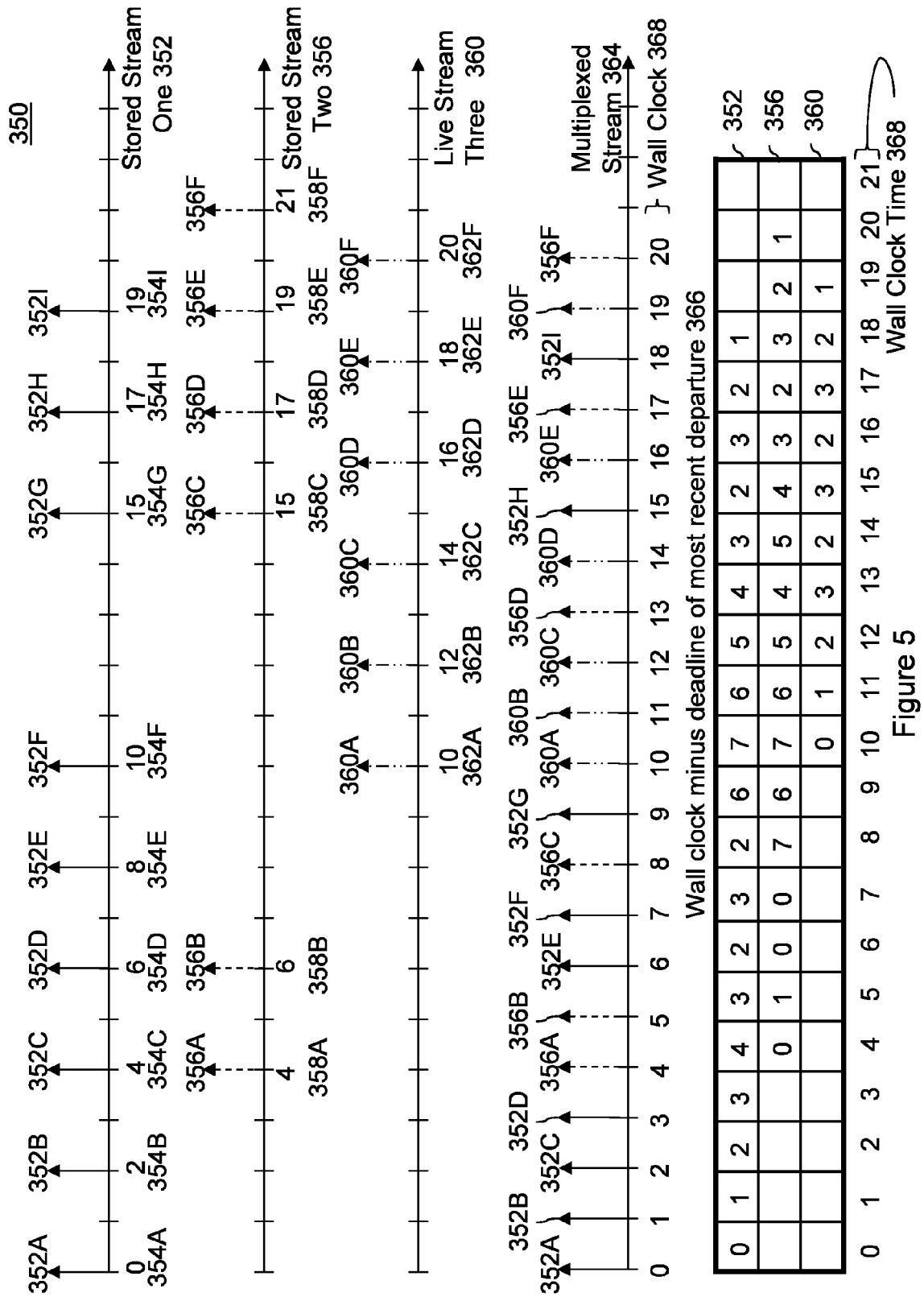
FIG. 5 shows an exemplary diagram of departure times for a statistical multiplexer.

FIG. 5 shows an exemplary diagram 350 of departure times for a statistical multiplexer. The diagram 350 includes stored stream one 352, stored stream two 356, live stream three 360, and multiplexed stream 364. Each stream has a peak bit-rate of 1 packet every 2 timeslots, and is initiated at a different instant in time. For example, stored stream one 352 is initiated at time 0, stored stream two 356 is initiated at time 4, and live stream three 360 is initiated at time 10. Stored stream one 352 includes packets 352A, 352B, 352C, 352D, 352E, etc. through 352I. Each packet (e.g., TS packet) of stored stream one 352 has a corresponding packet deadline. The packet deadline can be, for example, a PCR value. Packet 352A has a packet deadline of 0 354A, packet 352B has a packet deadline of 2 354B, packet 352C has a packet deadline of 4 354C, packet 352D has a packet deadline of 6 354D, packet 352E has a packet deadline of 8 354E, packet 352F has a packet deadline of 10 354F, packet 352G has a packet deadline of 15 354G, packet 352H has a packet deadline of 17 354H, and packet 352I has a packet deadline of 19 354I. Stored stream two 356 includes packets 356A through 356F. Each packet of stored stream two 356 has a corresponding packet deadline. Packet 356A has a deadline of 4 358A, packet 356B has a deadline of 6 358B, packet 356C has a deadline of 15 358C, packet 356D has a deadline of 17 358D, packet 356E has a deadline of 19 358E, and packet 356F has a deadline of 21 358F. Live stream three 360 includes packets 360A through 360F. Each packet of live stream three 360 has a corresponding packet deadline. Packet 360A has a packet deadline of 10 362A, packet 360B has a packet deadline of 12 362B, packet 360C has a packet deadline of 14 362C, packet 360D has a packet deadline of 16 362D, packet 360E has a packet deadline of 18 362E, and packet 360F has a packet deadline of 20 362F.

The multiplexed stream 364 shows the departure times of the packets for stored stream one 352, stored stream two 356, and live stream three 360. Each time slot of the multiplexed stream is indicative of a wall clock time (e.g., system clock time) on the indicia of the axis. For example, the departure time of packet 342A from stream one 352 in the multiplexed stream 364 occurred at wall clock time 0, and the departure of packet 356F from stored stream two 356 in the multiplexed stream 364 occurred at wall clock time 20. Table 366 indicates the delta of each TS packet (i.e., packets from stored stream one 352, stored stream two 356, and live stream three 360) transmission calculated as the wall clock time 368 minus the deadline of the most recent TS packet departure.

The multiplexed stream 364 and table 366 indicate an exemplary statistical multiplexing of the three streams and the produced multiplexed output. The first packet multiplexed into the multiplexed stream 364 is packet 352A from stored stream one 352. As indicated in table 366, the packet deadline of packet 352A is 0 354A. Transmission at wall clock time 0 has a delta of wall clock time 368 0 minus deadline 0 354A, which equals 0. This value is in the first column of table 366 at wall clock time column 0 for stored stream one 352. The remaining values for column 0 of table 366 are blank because there are no packets that need to be transmitted yet for stored stream two 354 and live stream three 360.

The second packet transmitted is packet 352B from stored stream one 352. Packet 352B can be transmitted next, for example, because there are not any packets from stored stream two 356 or live stream three 360 to transmit. The delta, as indicated in column 1 for table 366 is the deadline of 2 354B minus the wall clock time of 1, which equals a transmission of 1 time unit ahead of the actual deadline of packet 352B. At a wall clock time of 4, both stored stream one 352 and stored stream two 356 have packets which can be transmitted. Packet 352E is the next packet for stored stream one 352 to transmit, which has a deadline of 8 354D. As indicated in table 366 at column 4, the delta for packet 352E is deadline of 8 354D minus the wall clock time of 4, which is equal to 4. Packet 356A is the next packet for stored stream two 356 to transmit, which has a deadline of 4 358A. The delta for packet 356A is wall clock time 368 of 4 minus the deadline of 4 358A, which equals 0. Based on the two deltas, packet 356A is multiplexed in at wall clock time 4.

At wall clock time 368 of 10 (e.g., column 10 of table 366) all three streams have a packet to transmit. For stored stream one 352, packet 352H is the next packet with a deadline of 17 354H. The delta is wall clock time 368 of 10 minus deadline of 17 354H, which equals 7. For stored stream two 356, the next packet is 356D with a deadline 17 358D. The delta is wall clock time 368 of 10 minus deadline 17 358D, which equals 7. For live stream three 360, the next packet to transmit is packet 360A with a deadline of 10 362A. The delta is the wall clock time 368 of 10 minus the deadline 10 362A, which gives 0. Based on the three deltas, packet 360A is multiplexed in at wall clock time 10.

The stored streams can be pre-fetched as described with reference to FIG. 4A. For example, the packets for stored stream one 352 and stored stream two 356 can be stored prior to the statistical multiplexing operation. The statistical multiplexer can determine which packet to transmit based on the number of transmitted packets, the delta of the next packet for a particular stream, and/or the like. For example, stored stream one 352 has four packets multiplexed into the multiplexed stream 364 upon initiation. For stored stream two 356, the multiplexer can multiplex subsequent slots in the multiplexed stream 364 after initiation to allow stored stream two 356 to catch up to stored stream one 352. This can, for example, equalize how much ahead each stream gets with respect to the deadline of its most recently transmitted packet (i.e., the differences between the wall clock and the next packet for each stream as calculated in table 366). Live stream three 360 can be configured with a pre-fetch capability of, for example, two TS packets. Live streams can be limited by the pre-fetching capability because, for example, they depend on the transmitting source for TS packet availability. Valleys created by the live stream can be effectively utilized by the two stored streams (i.e., stored stream one 352 and stored stream two 356).

Based on the particular application of the statistical multiplexer as described with reference to FIGS. 2-5, multiple embodiments may be used and do not take away from the essence of the statistical multiplexer. For example, some embodiments may revert to JIT scheduling for a subset of streams in the multiplex (e.g., to address decoders with limited buffering, or for live streams, which cannot tolerate underflows despite its low frequency of incidence or cannot benefit from a high statistical multiplexing gain due to limited pre-fetch capability). For some embodiments, the scheduler can be adjusted to compensate for decoder buffer overflow (e.g., since EDF is work conserving in nature, it may not remove the possibility of decoder buffer overflow without additional regulation). For some embodiments, the multiplexer can account for the limited bandwidth available in downstream network links. The multiplexer can account for the limited bandwidth in addition to being constrained by its own output link.

Figure 6:
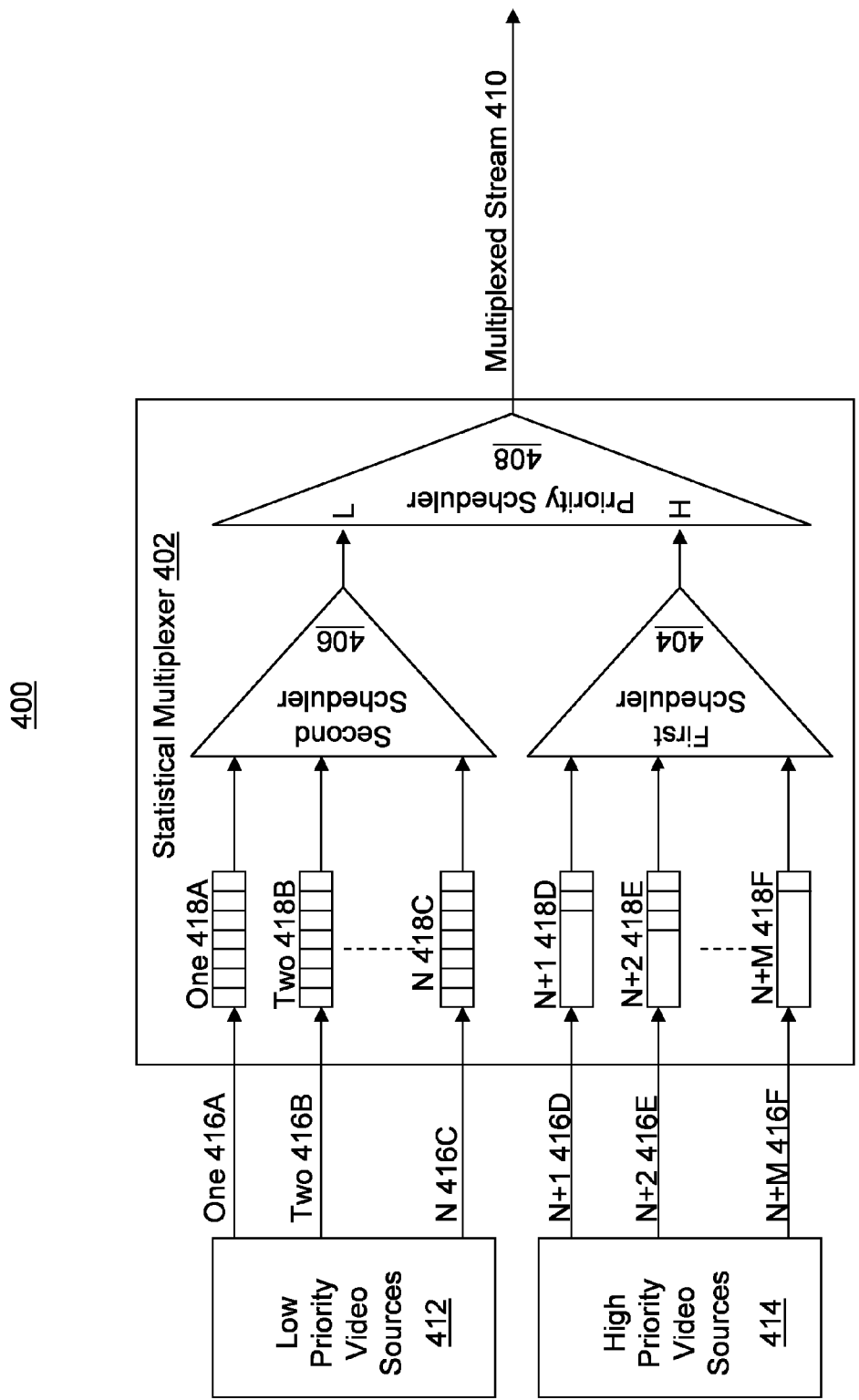
FIG. 6 shows a statistical multiplexing system of an alternate embodiment.

FIG. 6 shows a statistical multiplexing system 400 of an alternate embodiment. The statistical multiplexer 402 includes a first scheduler 404 and a second scheduler 406. The two schedulers can be, for example, a JIT scheduler and an EDF scheduler. The first scheduler 404 and second scheduler 406 are in communication with the priority scheduler 408. The priority scheduler 408 outputs a multiplexed stream 410. The streams received by the statistical multiplexer 402 are partitioned into low priority video sources 412 and high priority video sources 414. Low priority video sources 412 includes stream one 416A, stream two 416B, through stream N 416C. High priority video sources 414 includes stream N+1 416D, stream N+2 416E, through stream N+M 416F. Each stream the statistical multiplexer 402 receives is allocated a buffer. Stream one 416A is allocated stream buffer one 418A, stream two 416B is allocated stream buffer two 418B, stream N 416C is allocated stream buffer N 418C, stream N+1 416D is allocated stream buffer N+1 418D, stream N+2 416E is allocated stream buffer N+2 418E, and stream N+M 416F is allocated stream buffer N+M 418F.

Referencing FIG. 6, the statistical multiplexer 402 can consist of a hierarchical prioritized scheduler for the dequeue process, as opposed to a single scheduler (e.g., single EDF scheduler). The enqueue process (i.e., the enqueue process described with reference to FIG. 4A) and the rate adjustment method can be used with the statistical multiplexing system 400. The high priority video sources 414 can be, for example, streams that are destined to minimally compliant MPEG decoders, i.e., with minimal buffering and hence requiring a strict adherence to the VBV model, live streams that cannot tolerate any underflows are placed in a high priority set, and/or the like. The remaining streams can be placed in the low priority video sources (e.g., stored video destined for MPEG decoders with larger buffer sizes). While two schedulers are shown, the system can be extended to systems with three or more schedulers, three or more priority groups, or any combination thereof.

Figure 7:
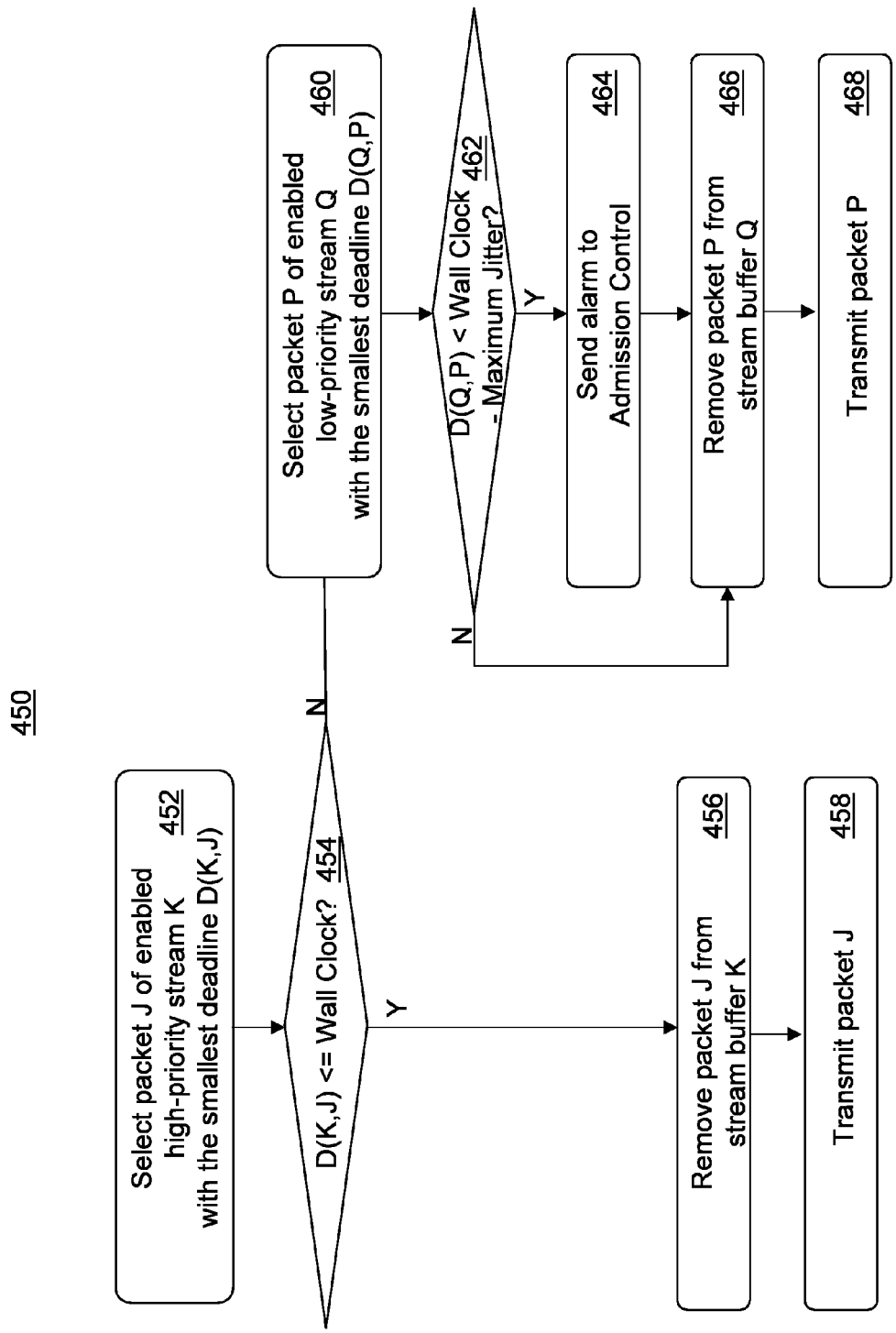
FIG. 7 shows a dequeue process of an alternate embodiment.

FIG. 7 shows a dequeue process 450 of an alternate embodiment. A packet J of an enabled high-priority stream K is selected 452 with the smallest deadline D(K,J). For example, referencing FIG. 6 the priority scheduler 408 selects from the first scheduler 404, which selects a high priority stream TS packet with the lowest deadline. It is determined 454 whether the deadline D(K,J) is less than or equal to the current wall clock value (e.g., mature with respect to the current wall clock value). If the deadline D(K,J) is less than or equal to the current wall clock value, packet J is dequeued 456 from the stream buffer. Packet J is dispatched 458 to the output link.

If the deadline D(K,J) is greater than the current wall clock value, packet P is selected 460 from an enabled low-priority stream Q with the smallest deadline D(Q,P). For example, if the deadline is greater than the current wall clock value, the dequeue process 450 can proceed as an EDF scheduler. The selection can be performed with the sorting data-structure. The deadline D(Q,P) is compared 462 with the current value of the wall clock, while compensating for the maximum scheduling jitter. The comparison can detect whether the packet might arrive too late at the decoder (i.e., cause a decoder buffer underflow). If a potential underflow is determined, an alarm is sent 464 to the admission control component. The selected packet P is removed 466 from the stream buffer Q. The packet J is dispatched 468 to the output link.

The PCR value in the TS packet header for packet J, packet Q, or both can be re-stamped to accurately reflect the modified departure time.

Notice that in some examples, the JIT scheduler is not work conserving in nature, while the EDF scheduler is work conserving. Consequently, JIT can be at a higher priority with respect to EDF to prevent starvation of the streams that it serves. Moreover, the admission control component reserves the peak bit-rate on the output link for each stream served by JIT. This ensures that the high priority packets never miss their deadlines, except for some scheduling jitter, much as in a simple multiplexer without statistical multiplexing. The scheduling opportunities for the low priority streams are in the inactivity periods, i.e., valleys, of the JIT scheduler, which are efficiently filled by the EDF scheduler. This technique ensures that each low priority stream gets sufficiently ahead to compensate for prolonged intervals wherein the inactivity periods of the JIT scheduler are few and far between each other. It is possible to extend this embodiment to provide multiple priorities, each served by EDF with the use of additional mechanisms, e.g., putting limits on the pre-fetch capability of live streams, in order to ensure that the EDF scheduler at a higher priority does not starve the one at a lower priority.

Figure 8:
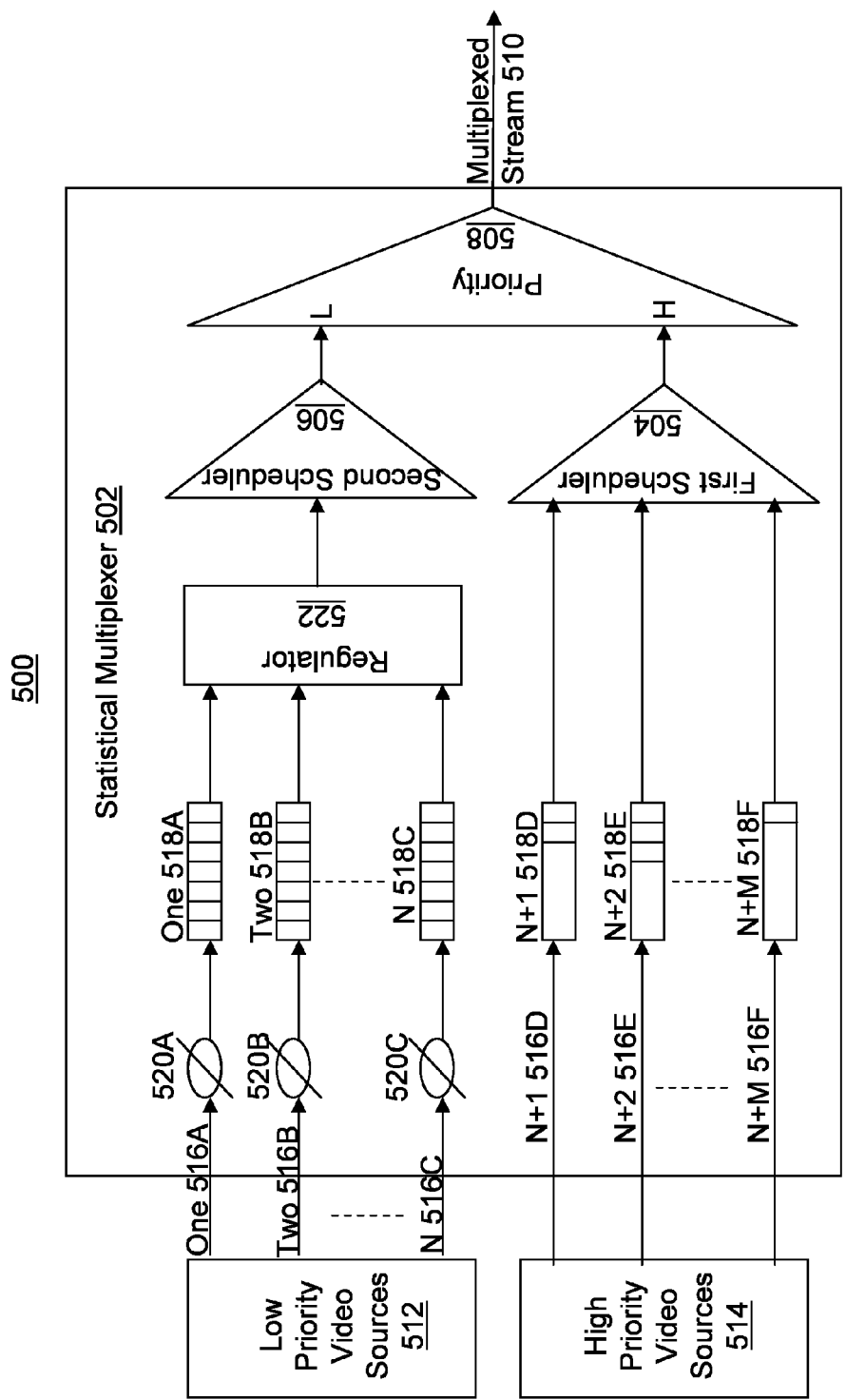
FIG. 8 shows a statistical multiplexing system of an alternate embodiment.

FIG. 8 shows a statistical multiplexing system 500 of an alternate embodiment. The statistical multiplexer 502 includes a first scheduler 504 and a second scheduler 506. The two schedulers can be, for example, a JIT scheduler and an EDF scheduler. The first scheduler 504 and second scheduler 506 are in communication with the priority scheduler 508. The priority scheduler 508 outputs a multiplexed stream 510. The streams received by the statistical multiplexer 502 are partitioned into low priority video sources 512 and high priority video sources 514. Low priority video sources 512 includes stream one 516A, stream two 516B, through stream N 516C. High priority video sources 514 includes stream N+1 516D, stream N+1 516E, through stream N+M 516F. Each stream the statistical multiplexer 502 receives is allocated a buffer. Stream one 516A is allocated stream buffer one 518A, stream two 516B is allocated stream buffer two 518B, stream N 516C is allocated stream buffer N 518C, stream N+1 516D is allocated stream buffer N+1 518D, stream N+2 516E is allocated stream buffer N+2 518E, and stream N+M 516F is allocated stream buffer N+M 518F. The stream buffers can each have a unique number of TS packets for its associated stream. The low priority video sources 512 can have shapers (e.g., shaper 520A for stream one 516A, shaper 520B for stream two 516B, and shaper 520C for stream N 516C). Each shaper is in communication with the associated stream buffer for the low priority video sources 512. For example, shaper 520A for stream one 516A is in communication with stream buffer one 518A. The stream buffers for the low priority video sources 512 (e.g., stream buffer one 518A through stream buffer N 518C) are in communication with a regulator 522. The regulator 522 is in communication with the second scheduler 506. The stream buffers allocated for high priority video sources 514 (e.g., stream buffer N+1 518D through stream buffer N+M 518F) are in communication with the first scheduler 504.

The regulator can impose a rate regulation constraint on the EDF scheduler. The regulator 522 can, for example, prevent a decoder buffer overflow that might otherwise occur due to the work conserving nature of the second scheduler 506 if configured as an EDF scheduler. The regulator 522 can account for bandwidth limitations of downstream network links. Any such regulation can, for example, lower the statistical multiplexing gain by increasing the effective bit-rates of the streams. The regulator 522 can limit the eligibility of certain streams to participate in the dequeue process. The regulator 522 can limit the eligibility of certain streams during certain instants. The second scheduler 506 (e.g., an EDF scheduler) can select the TS packet with the lowest deadline among eligible streams. The shapers (e.g., regulators) can limit the departure rate of each individual stream. For example, shaper 520A can limit the departure rate of stream one 516A. The regulator 552 can base the regulation on a difference between a departure time of a packet and its deadline, TCP feedback, available downstream bandwidth, and other such metrics.

Figure 9:
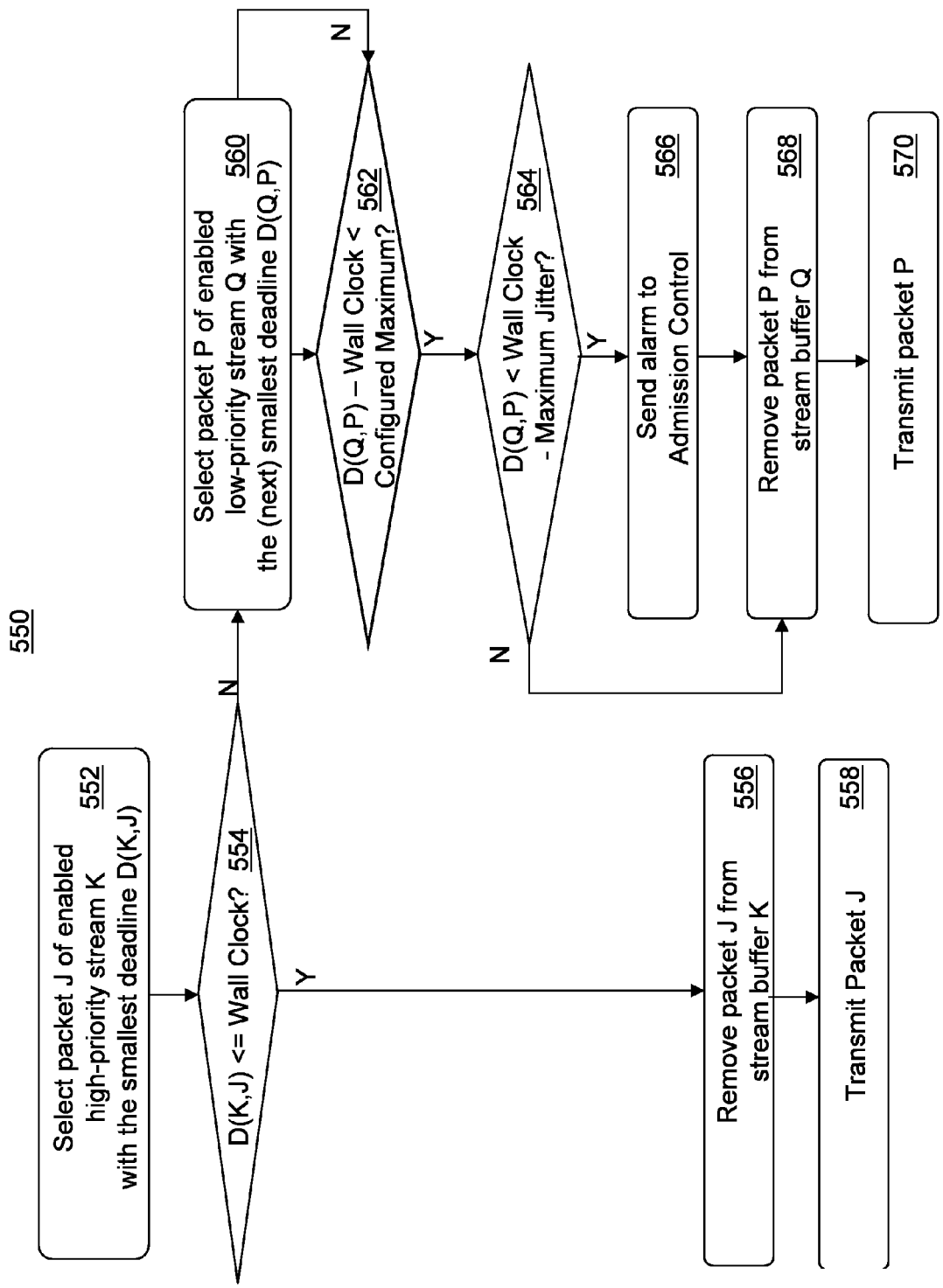
FIG. 9 shows a dequeue process of an alternate embodiment.

FIG. 9 shows a dequeue process 550 of an alternate embodiment. A packet J of an enabled high-priority stream K is selected 552 with the smallest deadline D(K,J). For example, referencing FIG. 8 the priority scheduler 508 selects from the first scheduler 504, which selects a high priority stream TS packet with the lowest deadline. It is determined 554 whether the deadline D(K,J) is less than or equal to the current wall clock value (e.g., mature with respect to the current wall clock value). If the deadline D(K,J) is less than or equal to the current wall clock value, packet J is dequeued 556 from the stream buffer. Packet J is dispatched 558 to the output link.

If the deadline D(K,J) is greater than the current wall clock value, packet P is selected 560 from an enabled low-priority stream Q with the smallest deadline D(Q,P). The selection can be performed with the sorting data-structure. The deadline D(Q,P) minus the current wall clock value is compared 562 with the configured maximum. If the deadline D(Q,P) minus the current wall clock value is greater than or equal to the configured maximum, the process proceeds back to step 560 to select the TS packet with the next lowest deadline until the regulator constraints are satisfied (e.g., until the deadline D(Q,P) minus the wall clock is less than the configured maximum). If the deadline D(Q,P) minus the current wall clock is less than the configured maximum (e.g., within the constraints of the regulator), the deadline D(Q,P) is compared 564 with the wall clock value adjusted for a maximum jitter. The comparison can detect whether the packet might arrive too late at the decoder (i.e., cause a decoder buffer underflow). If a potential underflow is determined, an alarm is sent 566 to the admission control component. The selected packet P is removed 568 from the stream buffer Q. The packet P is dispatched 570 to the output link.

The regulator 522 can prevent decoder buffer overflow. The amount of time that a TS packet arrives at a decoder ahead of its encoder specified arrival time equals the difference between its actual departure time and deadline. The regulator 522 can place a limit on the amount of time a TS packet arrives at a decoder ahead of its encoder specified arrival time by accounting for the available decoder buffer size. Accounting for the available decoder buffer size can prevent buffer overflow. The regulator 522 can limit how far ahead the delivery of TS packets gets with respect to, for example, their decoding time, presentation time, and/or the like. If, for example, a user decides to stop the video or initiate a trick-mode operation (e.g., fast-forward, rewind), the buffered TS packets would be discarded and their delivery through the network would represent a waste of network resources. The regulator 522 can, for example, use TCP feedback. The regulator 522 can use a bandwidth management scheme (e.g., to ensure that no downstream network link becomes over-subscribed due to the work conserving nature of, for example, an EDF scheduler). The regulator 522 can be extended to, for example, one scheduler systems (e.g., the system of FIG. 2). The regulator 522 can be extended to multiplexing systems with three or more schedulers, three or more priority groups, or any combination thereof.

While the descriptions above did not take into account the effect of transport packetization, those skilled in the art can appreciate the embodiments can be extended to focus on, for example, RTP/TCP transport packet timing. The descriptions above described the invention using the MPEG systems layer over fixed bandwidth links, but can be extended to other audio and video encoding standards. Newer video set-top boxes can provide for larger decoder buffers than the minimum required in a compliant MPEG decoder. The systems and methods disclosed herein can utilize increased buffer sizes to allow TS packets to arrive before their encoded PCR values. Early arrival of TS packets can eliminate some of the stringency of the VBV model that hampered traditional video stream multiplexers. The initial latency of presentation can still be dictated by the VBV model and may not increase despite the increase in the decoder buffer size. Larger stream buffers can enable the statistical multiplexers to transmit TS packets ahead of their normalized PCR values.

Some embodiments of the systems and methods described above can, for example, simultaneously support JIT scheduling for streams destined to minimally compliant set-top boxes, and for live streams in certain deployments wherein large stream buffers might impose an unacceptable delay. Some embodiments can regulate, for example, an EDF discipline to account for downstream bandwidth bottlenecks. Regulation can control the amount of decoder buffering so as to prevent overflow. Multiple network types can be used (e.g., open-loop networks based on RTP transport, closed-loop networks based on TCP, and/or the like). Some embodiments can be deployed as a stand-alone system. Some embodiments can be deployed as an embedded part of stored video streaming equipment.

Delimiters used herein (such as "first", "second", "1", "N+1", "N+M", and/or the like) have been used adjectivally to differentiate between multiple components. Unless otherwise indicated, the terms are not used to impose any order among the components, time of arrival/departure, and/or any other limitation.

The above-described systems and methods can be implemented in digital electronic circuitry, in computer hardware, firmware, and/or software. The implementation can be as a computer program product (i.e., a computer program tangibly embodied in a computer readable medium, such as a memory device or a disk). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method comprising:
  computing a deadline of a packet of a compressed video stream based on a program clock reference value of the packet;
  sorting a plurality of packets, which includes the packet, based on deadlines corresponding to the packets;
  selecting a next packet from the sorted plurality of packets, the next packet having a corresponding deadline nearest to a system clock time; and transmitting the next packet at a time earlier than a departure time established during encoding corresponding to the next packet if a downstream network link used to transmit the next packet has available bandwidth for the next packet, transmitting the next packet in a multiplexed stream at the time earlier than the departure time established during encoding corresponding to the next packet if the multiplexed stream has available bandwidth for the next packet, or any combination thereof.

2. The method of claim 1, further comprising:
  receiving one or more packets associated with a live compressed video stream;
  buffering the one or more packets associated with a live compressed video stream in a first buffer;
  retrieving one or more packets associated with a stored compressed video stream; and
  buffering the one or more packets associated with the stored compressed video stream in a second buffer.

3. The method of claim 1, wherein computing comprises computing the deadline based on a normalized program clock reference value of the packet.

4. The method of claim 1, wherein the program clock reference is a PCR of an MPEG TS packet, a time stamp of an RTP packet, or any combination thereof.

5. The method of claim 1, further comprising modifying a program clock reference value in the next packet with a modified departure time.

6. The method of claim 1, further comprising:
   determining the next packet departs at a system clock time greater than the deadline corresponding to the next packet plus a maximum jitter; and
   sending an electronic notification.

7. The method of claim 1, further comprising determining whether the next packet adheres to a rate regulation prior to transmitting the next packet.

8. The method of claim 2, further comprising:
   receiving a new packet associated with the live compressed video stream;
   determining the first buffer is full;
   generating an electronic notification; and
   selecting and discarding a second packet of the live compressed video stream from the first buffer.

9. The method of claim 2, wherein buffering the one or more packets associated with the stored compressed video stream comprises obtaining the one or more packets associated with the stored compressed video stream when the second buffer is below a predefined threshold for a fullness state of the second buffer.

10. The method of claim 2, further comprising preventing de-queuing of the first buffer, the second buffer, or both, until a predefined threshold for a corresponding fullness state is reached.

11. The method of claim 3, wherein computing comprises computing the normalized program clock reference value based on adding the program clock reference value of the packet to a difference between a deadline of an initial packet of the first compressed video stream and a program clock reference value of the initial packet.

12. The method of claim 7, wherein the rate regulation is based on a difference between a departure time of the second packet and the second deadline, TCP feedback, available downstream bandwidth, a network structure, or any combination thereof.

13. The method of claim 7, further comprising delaying transmitting the next packet based on the rate regulation determination.

14. The method of claim 7, further comprising:
   determining the second packet does not adhere to the rate regulation; and
   selecting a third packet from the second priority group, the third packet having a third deadline, the third deadline being a second earliest deadline of the second priority group.

15. The method of claim 1, wherein transmitting comprises adding the next packet to a multiplexed stream at a slot earlier than an assigned slot in the multiplexed stream.

16. A method comprising:
   determining a first priority group and a second priority group for compressed video streams;
   selecting a first packet of a first compressed video stream from the first priority group, the first packet having a first deadline, the first deadline being an earliest deadline of the first priority group;
   determining whether to transmit the first packet based on the first deadline and a system clock time;
   if the first packet is to be transmitted, transmitting the first packet;
   if the first packet is not to be transmitted, selecting a second packet from a second compressed video stream from the second priority group, the second packet having a second deadline, the second deadline being an earliest deadline of the second priority group; and
   transmitting the second packet before the second deadline.

17. The method of claim 16, wherein determining whether to transmit the first packet comprises determining whether the first deadline is less than or equal to the system clock time.

18. The method of claim 16, further comprising:
   determining the second packet departs when the system clock time is greater than the second deadline plus a maximum jitter; and
   sending an electronic notification.

19. The method of claim 16, further comprising determining the second packet adheres to a rate regulation.

20. The method of claim 19, further comprising:
   determining the second packet does not adhere to the rate regulation; and
   selecting a third packet from the second priority group, the third packet having a third deadline, the third deadline being a second earliest deadline of the second priority group.

21. The method of claim 16, wherein selecting the first packet comprises selecting the first packet from a stream of a first plurality of streams of the first priority group, wherein the first deadline is a smallest deadline of packets of the first plurality of streams.

22. The method of claim 19, wherein the rate regulation is based on a difference between a departure time of the second packet and the second deadline, TCP feedback, available downstream bandwidth, a network structure, or any combination thereof.

23. The method of claim 21, wherein selecting the second packet comprises selecting the second packet from a stream of a second plurality of streams of the second priority group, wherein the second deadline is a smallest deadline of packets of the second plurality of streams.

24. A system comprising:
   a scheduler configured to:
      compute a first deadline of a first packet of a first compressed video stream based on a program clock reference value of the first packet;
      sort a plurality of packets, which includes the first packet, based on deadlines corresponding to the packets; and
      select a next packet from the sorted plurality of packets, the next packet having a nearest deadline; and
   a transmitter in communication with the scheduler configured to transmit the next packet at a time earlier than a departure time established during encoding corresponding to the next packet if a downstream network link used to transmit the next packet has available bandwidth for the next packet, transmitting the next packet in a multiplexed stream at the time earlier than the departure time established during encoding corresponding to the next packet if the multiplexed stream has available bandwidth for the next packet, or any combination thereof.

25. The system of claim 24, further comprising:
   a first buffer;
   a second buffer; and
   a receiver in communication with the first buffer and the second buffer configured to:
      receive one or more first packets of a live compressed video stream;
      buffer the one or more first packets in the first buffer;
      retrieve one or more second packets of a stored compressed video stream; and
      buffer the one or more second packets in the second buffer.

26. The system of claim 24, further comprising a decoder buffer in communication with the transmitter configured to buffer the next packet, wherein a size of the receiver buffer is greater than a standard buffer size used to support transmitting one or more packets of the first compressed video stream at corresponding PCR values.

27. A system comprising:
a first scheduler in communication with a first priority group configured to select a first packet of a first compressed video stream from the first priority group, the first packet having a first deadline, the first deadline being an earliest deadline of the first priority group;
a second scheduler in communication with a second priority group configured to select a second packet from a second compressed video stream from the second priority group, the second packet having a second deadline, the second deadline being an earliest deadline of the second priority group;
a multiplexer in communication with the first scheduler and the second scheduler, the multiplexer configured to:
 determine the first priority group and the second priority group for compressed video streams; and
 determine whether to transmit the first packet based on the first deadline and a system clock time; and
a transmitter in communication with the multiplexer, the transmitter configured to:
 transmit the first packet when the multiplexer determines the first packet is to be transmitted; or
 transmit the second packet before the second deadline when the multiplexer determines the first packet is not to be transmitted.

28. The system of claim 27, wherein the first scheduler is a just-in-time (JIT) scheduler and the second scheduler is an earliest-deadline-first (EDF) scheduler.

29. The system of claim 27, wherein the first scheduler and second scheduler are earliest-deadline-first (EDF) schedulers.

30. The system of claim 27, wherein the first priority group comprises one or more live compressed video streams, one or more stored streams destined to decoders with limited buffering, or any combination thereof.

31. The system of claim 27, wherein the second priority group comprises one or more stored compressed video streams.

32. The system of claim 27, further comprising a regulator in communication with the second priority group and the second scheduler configured to determine whether the second packet adheres to a rate regulation.

33. The system of claim 32, wherein the regulator is further configured to:
determine the second packet does not adhere to a rate regulation; and
select a third packet from the second priority group, the third packet having a third deadline, the third deadline being a second earliest deadline of the second priority group.

34. A computer program product, tangibly embodied in a non-transitory computer readable medium, the computer program product including instructions being operable to cause a data processing apparatus to:
compute a deadline of a packet of a compressed video stream based on a program clock reference value of the packet;
sort a plurality of packets, which includes the packet, based on deadlines corresponding to the packets;
select a next packet from the sorted plurality of packets, the next packet having a corresponding deadline nearest to a system clock time; and
transmit the next packet at a time earlier than a departure time established during encoding corresponding to the next packet if a downstream network link used to transmit the next packet has available bandwidth for the next packet, transmitting the next packet in a multiplexed stream at the time earlier than the departure time established during encoding corresponding to the next packet if the multiplexed stream has available bandwidth for the next packet, or any combination thereof.

35. A computer program product, tangibly embodied in a non-transitory computer readable medium, the computer program product including instructions being operable to cause a data processing apparatus to:
determine a first priority group and a second priority group for compressed video streams;
select a first packet of a first compressed video stream from the first priority group, the first packet having a first deadline, the first deadline being an earliest deadline of the first priority group;
determine whether to transmit the first packet based on the first deadline and a system clock time;
if the first packet is to be transmitted, transmit the first packet;
if the first packet is not to be transmitted, select a second packet from a second compressed video stream from the second priority group, the second packet having a second deadline, the second deadline being an earliest deadline of the second priority group; and
transmit the second packet before the second deadline.

36. A system comprising:
means for computing a deadline of a packet of a compressed video stream based on a program clock reference value of the packet;
means for sorting a plurality of packets, which includes the packet, based on deadlines corresponding to the packets;
means for selecting a next packet from the sorted plurality of packets, the next packet having a corresponding deadline nearest to a system clock time; and
means for transmitting the next packet at a time earlier than a departure time established during encoding corresponding to the next packet if a downstream network link used to transmit the next packet has available bandwidth for the next packet, transmitting the next packet in a multiplexed stream at the time earlier than the departure time established during encoding corresponding to the next packet if the multiplexed stream has available bandwidth for the next packet, or any combination thereof.

37. A system comprising:
means for determining a first priority group and a second priority group for compressed video streams;
means for selecting a first packet of a first compressed video stream from the first priority group, the first packet having a first deadline, the first deadline being an earliest deadline of the first priority group;
means for determining whether to transmit the first packet based on the first deadline and a system clock time;
means for transmitting the first packet if the first packet is to be transmitted;
means for selecting a second packet from a second compressed video stream from the second priority group if the first packet is not to be transmitted, the second packet having a second deadline, the second deadline being an earliest deadline of the second priority group; and
means for transmitting the second packet before the second deadline.

* * * * *

UNITED STATES PATENT AND TRADEMARK OFFICE
CERTIFICATE OF CORRECTION

PATENT NO.        : 7,885,270 B2                                               Page 1 of 1
APPLICATION NO.   : 12/121500
DATED             : February 8, 2011
INVENTOR(S)       : Frink et al.

It is certified that error appears in the above-identified patent and that said Letters Patent is hereby corrected as shown below:

Title Page
Under item (73) Assignee, on page 1, delete "Verlvue" and replace with -- Verivue --.

Signed and Sealed this
Tenth Day of May, 2011

David J. Kappos
*Director of the United States Patent and Trademark Office*